United States Patent
Ogino et al.

(10) Patent No.: US 11,635,140 B2
(45) Date of Patent: Apr. 25, 2023

(54) SHIFT DEVICE

(71) Applicant: AISIN CORPORATION, Kariya (JP)

(72) Inventors: Atsuto Ogino, Kariya (JP); Yutaka Uchida, Kariya (JP); Kota Ishikawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/521,260

(22) Filed: Nov. 8, 2021

(65) Prior Publication Data

US 2022/0145987 A1 May 12, 2022

(30) Foreign Application Priority Data

Nov. 12, 2020 (JP) .............................. JP2020-189006

(51) Int. Cl.
*F16H 61/32* (2006.01)
*F16H 61/24* (2006.01)
*F16H 61/28* (2006.01)

(52) U.S. Cl.
CPC ............ *F16H 61/32* (2013.01); *F16H 61/24* (2013.01); *F16H 2061/247* (2013.01); *F16H 2061/283* (2013.01); *F16H 2061/326* (2013.01)

(58) Field of Classification Search
CPC .... F16H 61/32; F16H 61/24; F16H 2061/247; F16H 2061/283; F16H 2061/326; F16H 2342/02; F16H 61/28; F16H 63/3458; F16H 63/38

See application file for complete search history.

(56) References Cited

U.S. PATENT DOCUMENTS

| 7,370,547 B2* | 5/2008 | Amamiya ............... F16H 61/32 74/335 |
| 7,382,107 B2* | 6/2008 | Hori ....................... F16H 61/32 74/440 |
| 8,707,817 B2* | 4/2014 | Itazu .................... F16H 63/3466 74/473.12 |
| 2008/0168853 A1 | 7/2008 | Amamiya et al. |
| 2008/0210033 A1 | 9/2008 | Amamiya et al. |
| 2020/0378495 A1* | 12/2020 | Uchida ............... F16H 63/3466 |

FOREIGN PATENT DOCUMENTS

JP 2005-69406 A 3/2005

* cited by examiner

*Primary Examiner* — Victor L Macarthur
(74) *Attorney, Agent, or Firm* — Oblon, McClelland, Maier & Neustadt, L.L.P.

(57) ABSTRACT

A shift device includes: a shift switching member including valley portions provided so as to correspond to shift positions; a positioning member causing the shift position to be established while being fitted in any of the valley portions of the shift switching member; a motor driving the shift switching member and including a rotor and a stator; a driving force transmission mechanism transmitting a driving force from the motor to the shift switching member; and a rotor rotation angle sensor and an output shaft rotation angle sensor detecting rotation angles of the rotor and the shift switching member. The shift device corrects a deviation from a center of a preset backlash when a backlash width included in the driving force transmission mechanism detected based on output values of the output shaft rotation angle sensor and the rotor rotation angle sensor is a value or more during a shift switching operation.

7 Claims, 12 Drawing Sheets

DRIVING FORCE TRANSMITTABLE STATE

DRIVING FORCE NON-TRANSMISSION STATE
(SWINGABLE STATE)

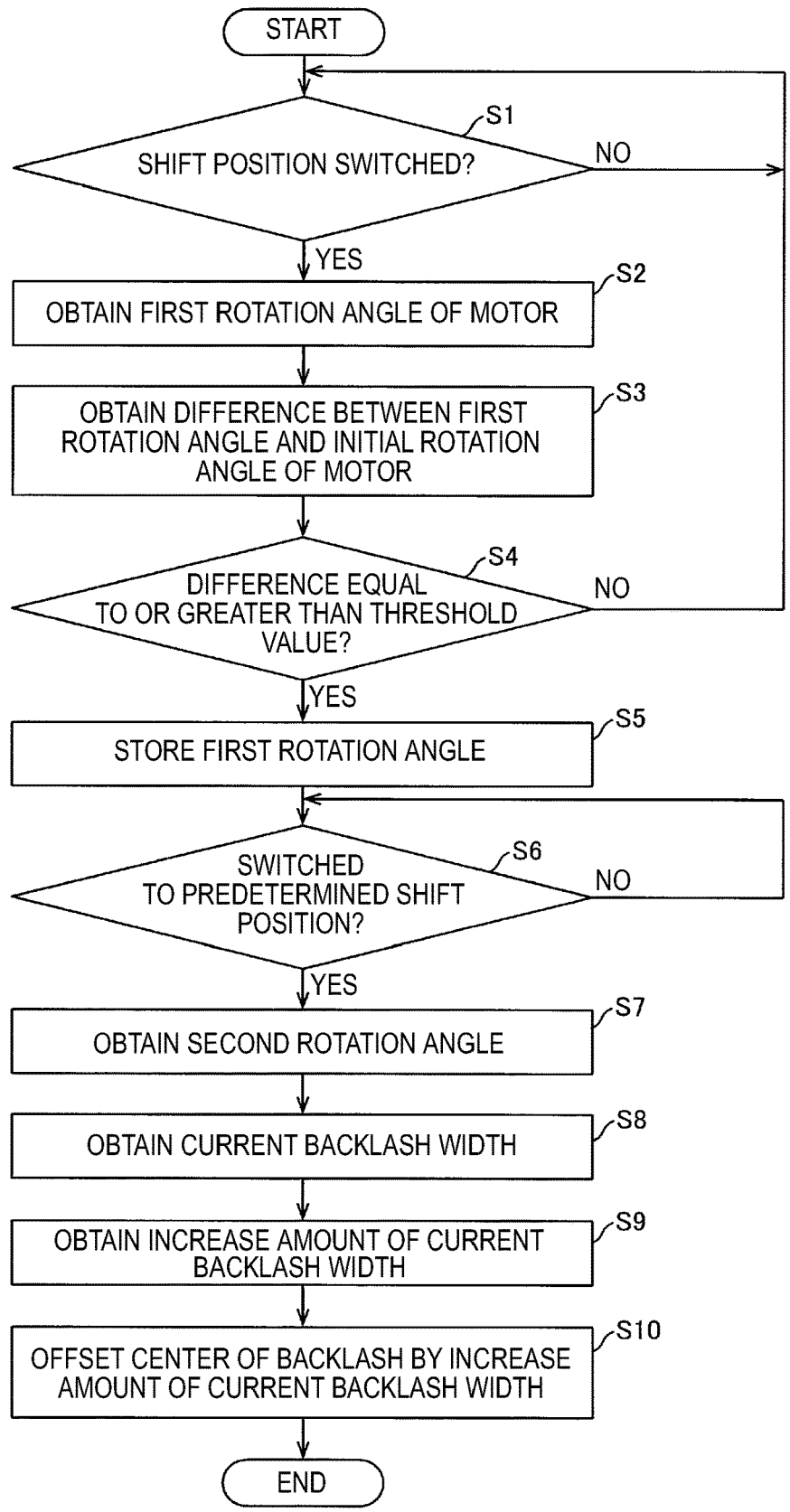

SHIFT DEVICE

CROSS REFERENCE TO RELATED APPLICATIONS

This application is based on and claims priority under 35 U.S.C. § 119 to Japanese Patent Application 2020-189006, filed on Nov. 12, 2020, the entire content of which is incorporated herein by reference.

TECHNICAL FIELD

This disclosure relates to a shift device, and more particularly to a shift device including a shift switching member including a plurality of valley portions.

BACKGROUND DISCUSSION

In the related art, there has been known a shift device including a shift switching member including a plurality of valley portions (see, for example, JP 2005-69406A (Reference 1)).

The above-mentioned Reference 1 discloses a shift range switching device including a detent plate including a plurality of (two) valley portions. The shift range switching device includes a detent spring, a P-ECU, an actuator, and a shift control mechanism. The detent plate is a shift switching unit that is driven by the actuator to switch a shift range. The detent spring is configured to fix the shift range of the detent plate. The P-ECU is configured to control an operation of the actuator that drives the shift control mechanism in order to switch the shift range between a P range and a non-P range. Here, the P range is a state in which the detent spring is switched to a valley portion on one side of the two valley portions of the detent plate. Further, the non-P range is a state in which the detent spring is switched to the valley portion on the other side of the two valley portions of the detent plate.

The detent plate of the above-mentioned Reference 1 includes a mountain portion provided between the valley portion on one side and the valley portion on the other side, a P wall provided on a side facing the mountain portion side in the valley portion on one side, and a non-P wall provided on a side facing the mountain portion side in the valley portion on the other side. Each of the P wall and the non-P wall is configured to regulate a rotation of the detent plate by coming into contact with the detent spring.

The P-ECU of Reference 1 is configured to detect a P wall position and set the detected P wall position as a reference position. That is, the P-ECU is configured to perform control for obtaining the P wall position as a reference position based on the fact that the detent spring is pressed against the P wall and the rotation of the detent plate is stopped for a predetermined time. Accordingly, the P-ECU is configured to perform control for correcting the P wall position as a preset reference position. Then, the P-ECU is configured to perform control for correcting a target rotation position of the actuator where the detent spring reaches a valley bottom of the valley portion on one side of the detent plate without the detent spring and the P wall colliding with each other.

Further, the P-ECU of the above-mentioned Reference 1 is configured to detect a non-P wall position and set the detected non-P wall position as a reference position. That is, the P-ECU is configured to perform control for obtaining the non-P wall position as a reference position based on the fact that the detent spring is pressed against the non-P wall and the rotation of the detent plate is stopped for a predetermined time. Accordingly, the P-ECU is configured to perform control for correcting the non-P wall position as a preset reference position. The P-ECU is configured to perform control for correcting the target rotation position of the actuator where the detent spring reaches a valley bottom of the valley portion on the other side of the detent plate without the detent spring and the non-P wall colliding with each other.

In the P-ECU of the above-mentioned Reference 1, when the P wall position and the non-P wall position deviate due to an increase in a backlash amount due to wear in the shift device, it is possible to correct the target rotation position of the actuator by performing P wall position detection and non-P wall position detection.

However, in the shift device of the above-mentioned Reference 1, it is necessary to press the detent spring against the P wall for a predetermined time in order to obtain the P wall position. Further, it is necessary to press the detent spring against the non-P wall for a predetermined time in order to obtain the non-P wall position. Accordingly, in the shift device of the above-mentioned Reference 1, there is a problem that the target rotation position (rotation angle) of the actuator (motor) that causes the detent spring (positioning member) to reach the valley bottoms of the valley portions of the detent plate (shift switching member) cannot be corrected unless an excessive load is applied to the detent spring.

A need thus exists for a shift device which is not susceptible to the drawback mentioned above.

SUMMARY

A shift device according to one aspect of this disclosure is directed to a shift device mounted on a vehicle. The shift device includes a shift switching member including a plurality of valley portions provided so as to correspond to shift positions, a positioning member configured to cause the shift position to be established while being fitted in any of the plurality of valley portions of the shift switching member, a motor configured to drive the shift switching member and including a rotor and a stator, a driving force transmission mechanism configured to transmit a driving force from the motor to the shift switching member, a rotor rotation angle sensor configured to detect a rotation angle of the rotor, and an output shaft rotation angle sensor configured to detect a rotation angle of the shift switching member, in which the shift device is configured to correct a deviation from a center of a preset backlash when a backlash width included in the driving force transmission mechanism detected based on an output value of the output shaft rotation angle sensor and an output value of the rotor rotation angle sensor is equal to or greater than a predetermined value during a shift switching operation.

BRIEF DESCRIPTION OF THE DRAWINGS

The foregoing and additional features and characteristics of this disclosure will become more apparent from the following detailed description considered with the reference to the accompanying drawings, wherein:

FIG. 17 is a flowchart showing a backlash center position correction process in the shift device according to the embodiment.

DETAILED DESCRIPTION

Hereinafter, embodiments disclosed here will be described with reference to the drawings.

A configuration of a shift device 100 will be described with reference to FIGS. 1 to 16. In the specification of the present application, "motor rotation angle" and "rotor rotation angle" have the same meaning.

Figure 1:
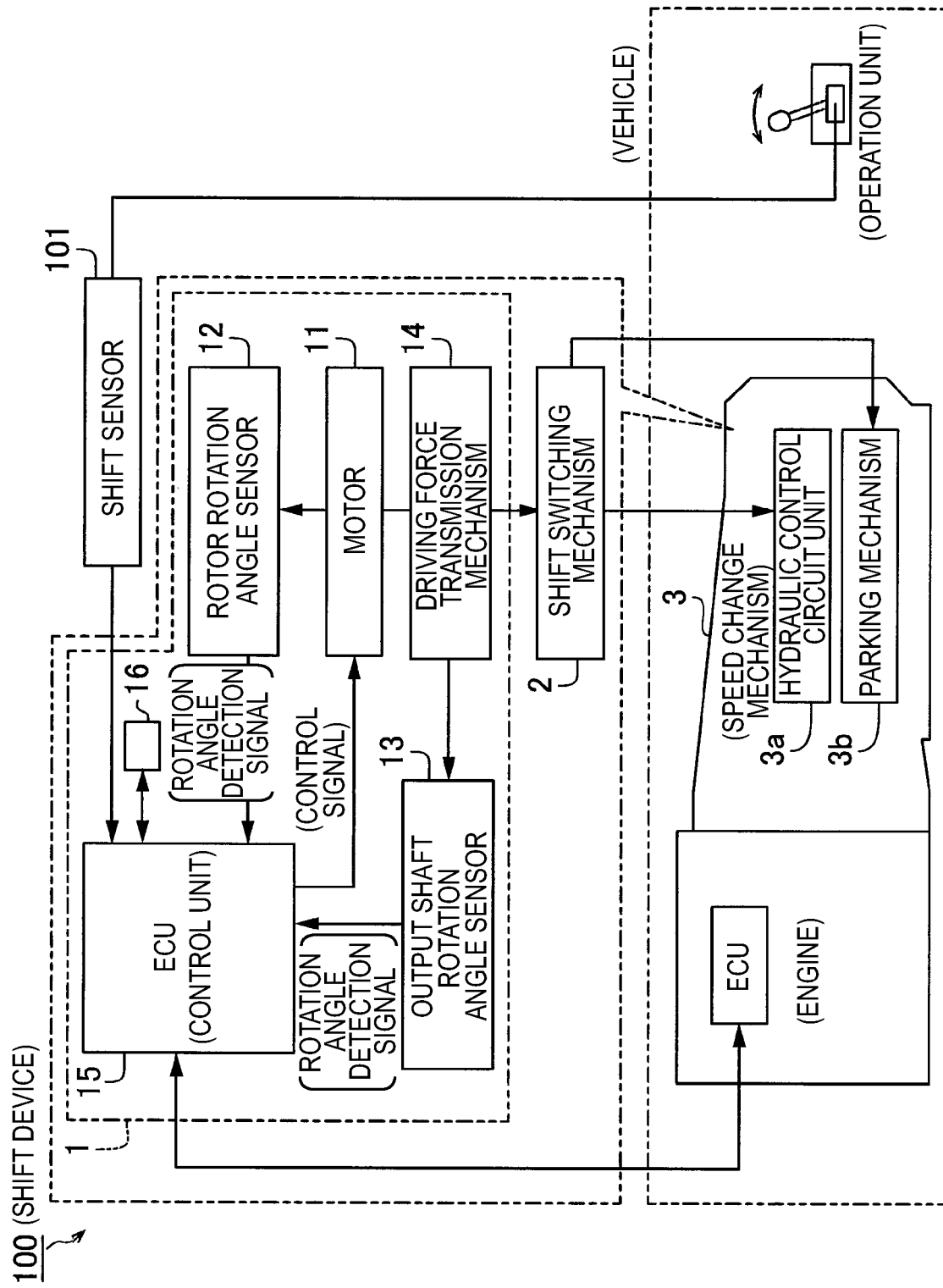
FIG. 1 is a block diagram showing a control configuration of a shift device according to an embodiment.

The shift device 100 is mounted on a vehicle such as an automobile. As shown in FIG. 1, when an occupant performs a shift switching operation via an operation unit such as a shift lever (or a shift switch), a speed change mechanism 3 is subjected to electrical shift switching control in the vehicle. That is, a position of the shift lever is input to the shift device 100 side via a shift sensor 101 provided in the operation unit. Then, based on a control signal transmitted from a dedicated ECU 15 provided in the shift device 100, the speed change mechanism 3 is switched to any of shift positions of a P (parking) position, an R (reverse) position, an N (neutral) position, and a D (drive) position corresponding to a shift operation of the occupant. Such shift switching control is called shift-by-wire (SBW).

The shift device 100 includes an actuator unit 1 and a shift switching mechanism 2 driven by the actuator unit 1. The shift switching mechanism 2 is mechanically connected to a manual spool valve (not shown) of a hydraulic valve body in a hydraulic control circuit unit 3a and a parking mechanism 3b in the speed change mechanism 3. Further, a shift state (a P position, an R position, an N position and a D position) of a transmission is mechanically switched by driving the shift switching mechanism 2.

Figure 2:
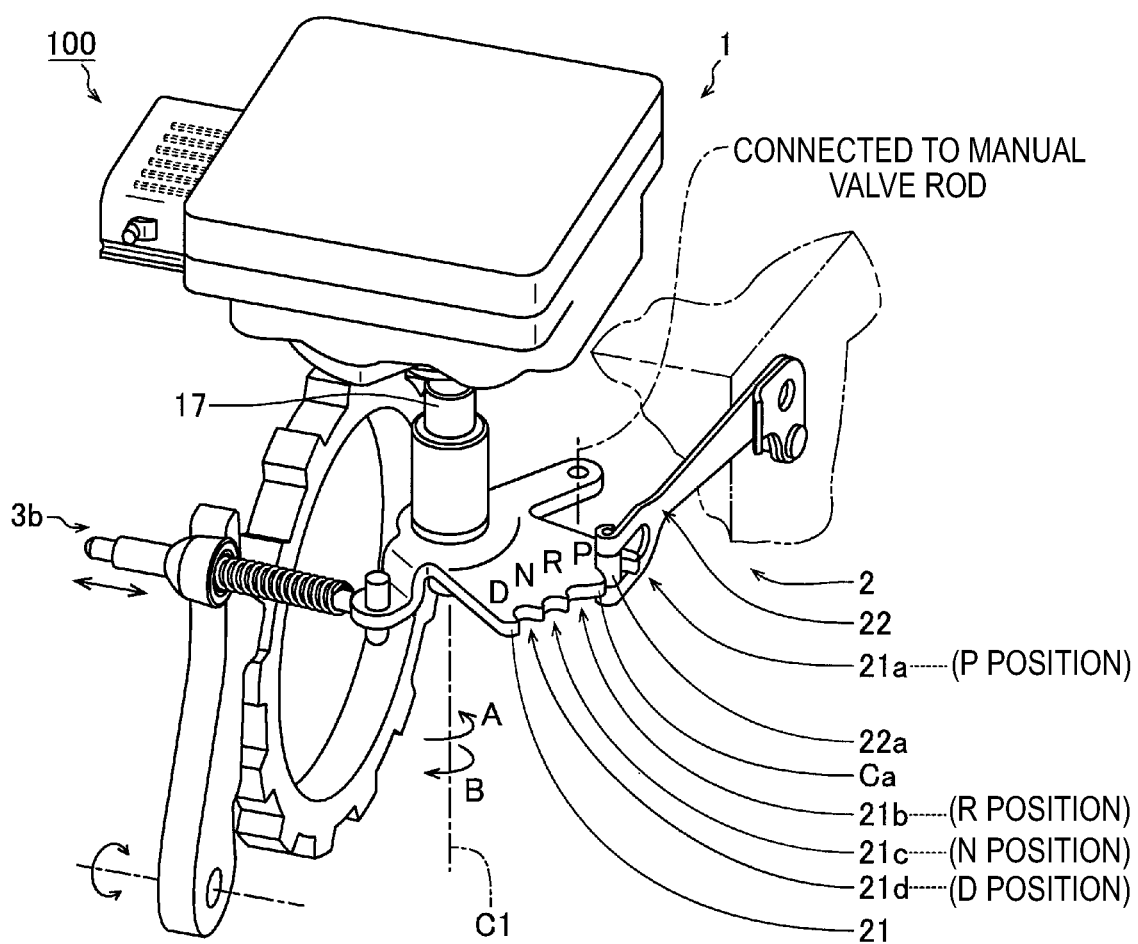
FIG. 2 is a perspective view schematically showing an overall configuration of the shift device according to the embodiment.

The actuator unit 1 includes a motor 11, a rotor rotation angle sensor 12, an output shaft rotation angle sensor 13, a driving force transmission mechanism 14, and an electronic control unit (ECU) 15. As shown in FIG. 2, the ECU 15 is a substrate component in which electronic components are mounted on a substrate. Further, these substrate components are housed in a box-shaped main body portion fixed to a case of the speed change mechanism 3. Further, the actuator unit 1 includes an output shaft 17 connected to an output side of a speed reducing mechanism 14a.

As shown in FIG. 2, the shift switching mechanism 2 includes a detent plate 21 (an example of "shift switching member" in the claims) and a detent spring 22 (an example of "positioning member" in the claims). The detent spring 22 is configured to hold the detent plate 21 at rotation angle positions corresponding to the P position, the R position, the N position, and the D position, respectively.

Figure 3:
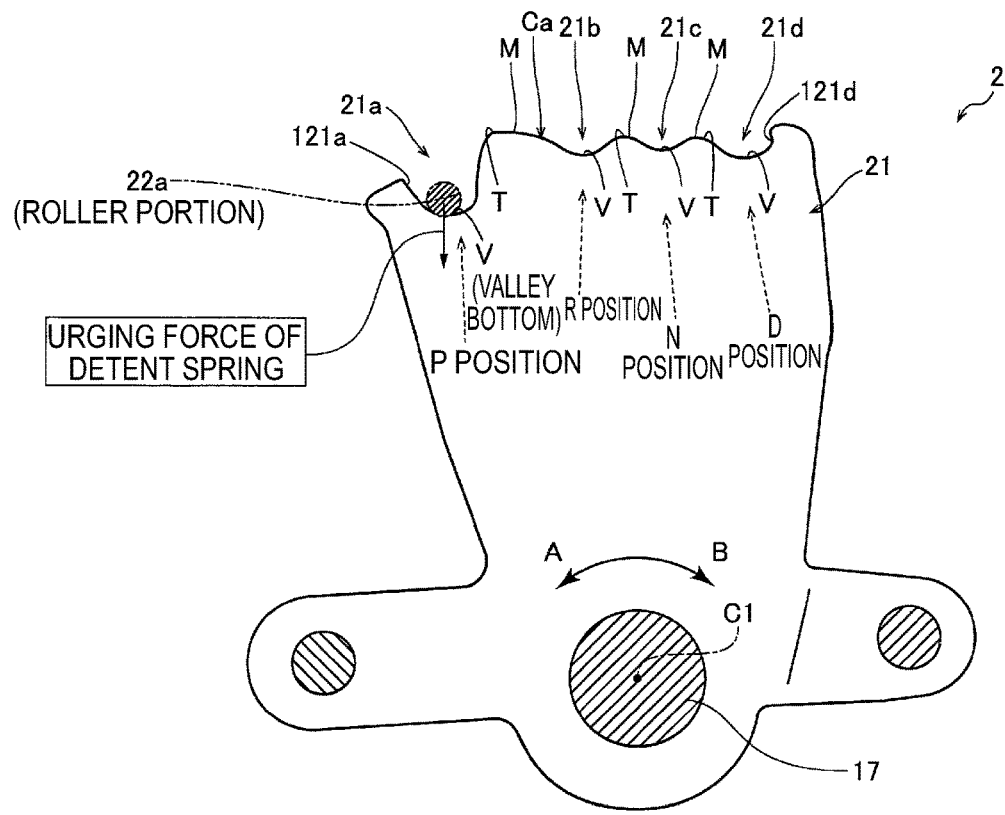
FIG. 3 is a diagram showing a structure of a detent plate constituting the shift device according to the embodiment.

As shown in FIG. 3, the detent plate 21 has four valley portions 21a, 21b, 21c, and 21d provided so as to correspond to shift positions (the P position, the R position, the N position and the D position). Further, the valley portion 21a, the valley portion 21b, the valley portion 21c, and the valley portion 21d form a cam surface Ca having a continuous undulating shape on the detent plate 21. Further, adjacent valley portions (for example, the valley portions 21a and 21b, the valley portions 21b and 21c, and the like) are separated by a mountain portion M having one top portion T. The detent spring 22 is configured such that a base end portion thereof (see FIG. 2) is fixed to a casing (see FIG. 2) of the speed change mechanism 3, and a roller portion 22a is attached to a free end (see FIG. 2) side thereof. Then, the detent spring 22 is configured such that the roller portion 22a always presses the cam surface Ca (the position of any of the valley portion 21a, the valley portion 21b, the valley portion 21c, the valley portion 21d, and the mountain portions M). Then, the detent spring 22 establishes a shift position while being fitted in any of the plurality of valley portions 21a, 21b, 21c, and 21d.

Further, as shown in FIG. 3, the valley portion 21a arranged on an outermost end side is provided with a wall portion 121a for preventing the detent spring 22 from moving beyond the valley portion 21a. The valley portion 21d arranged on an outermost end side is provided with a wall portion 121d for preventing the detent spring 22 from moving beyond the valley portion 21d. Specifically, the wall portion 121a is provided at the valley portion 21a arranged at an end portion of the detent plate 21 in a direction of an arrow A (an example of "first direction" in the claims). Further, the wall portion 121d is provided at the valley portion 21d arranged at an end portion of the detent plate 21 in a direction of an arrow B (an example of "second direction" in the claims).

Further, as shown in FIG. 2, the detent plate 21 is fixed to a lower end portion (Z2 side) of the output shaft 17, and the detent plate 21 is rotated around a rotation axis C1 integrally with the output shaft 17. Thus, the detent spring 22 is configured such that the roller portion 22a slides along the cam surface Ca as the detent plate 21 rotates (swings) forward and reverse in the direction of the arrow A or the direction of the arrow B, so that the roller portion 22a is fitted into any of the valley portion 21a, the valley portion 21b, the valley portion 21c and the valley portion 21d by an urging force of the detent spring 22. Further, the detent spring 22 is configured such that the roller portion 22a is selectively fitted into any of the valley portion 21a, the valley portion 21b, the valley portion 21c and the valley portion 21d of the detent plate 21, so that the detent plate 21 is held at a rotation angle position corresponding to the P position, the R position, the N position, or the D position, respectively. Accordingly, the P position, the R position, the N position or the D position is individually established.

Further, as shown in FIG. 1, the shift device 100 includes a non-volatile storage unit 16. The non-volatile storage unit 16 is provided inside the actuator unit 1.

Next, a detailed configuration of the actuator unit 1 will be described.

Figure 4:
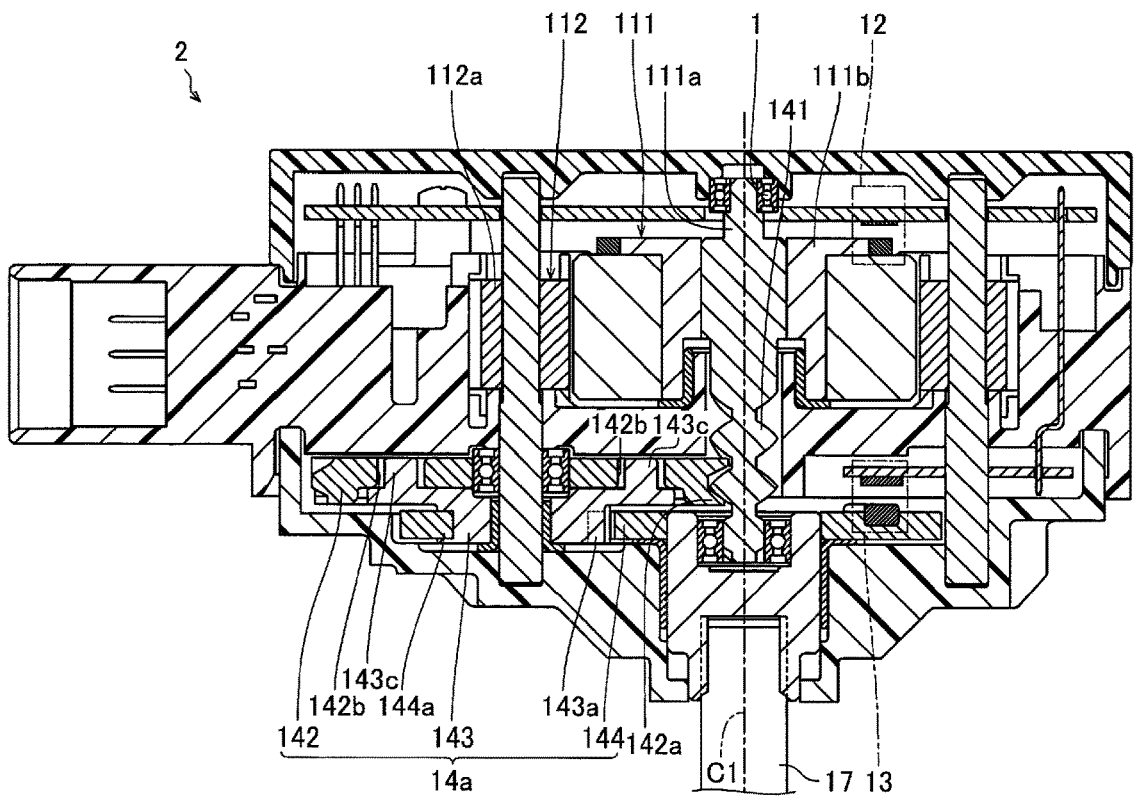
FIG. 4 is a cross-sectional view showing an actuator unit constituting the shift device according to the embodiment.

As shown in FIG. 4, the motor 11 includes a rotor 111 rotatably supported with respect to a motor housing and a stator 112 arranged so as to face each other with a magnetic gap around the rotor 111. Further, the motor 11 is configured to drive the detent plate 21.

Further, a surface magnet type (SPM) three-phase motor having a permanent magnet incorporated in the surface of the rotor 111 is used as the motor 11. Specifically, the rotor 111 has a shaft pinion 111a and a rotor core 111b.

The shaft pinion 111a of the rotor 111 and the output shaft 17 are rotated around the same rotation axis C1. Further, in the shaft pinion 111a, a gear portion 141 having a gear groove formed in a helical shape is integrally formed in an outer peripheral region extending from a central portion to the lower end portion (Z2 side).

The stator 112 has a stator core 112a fixed in a motor chamber of the motor housing, and an exciting coil (not shown) of a plurality of phases (U-phase, V-phase and W-phase) that generates a magnetic force when energized.

The rotor rotation angle sensor 12 is configured to detect a rotation angle of the motor 11. For example, the rotor rotation angle sensor 12 includes a magneto resistive (MR) sensor.

The output shaft rotation angle sensor 13 is configured to detect a rotation angle of the detent plate 21 (output shaft 17). For example, the output shaft rotation angle sensor 13 includes a Hall element. In addition, a rotation position (output angle) of the output shaft 17 is detected as a continuous voltage value.

Figure 5:
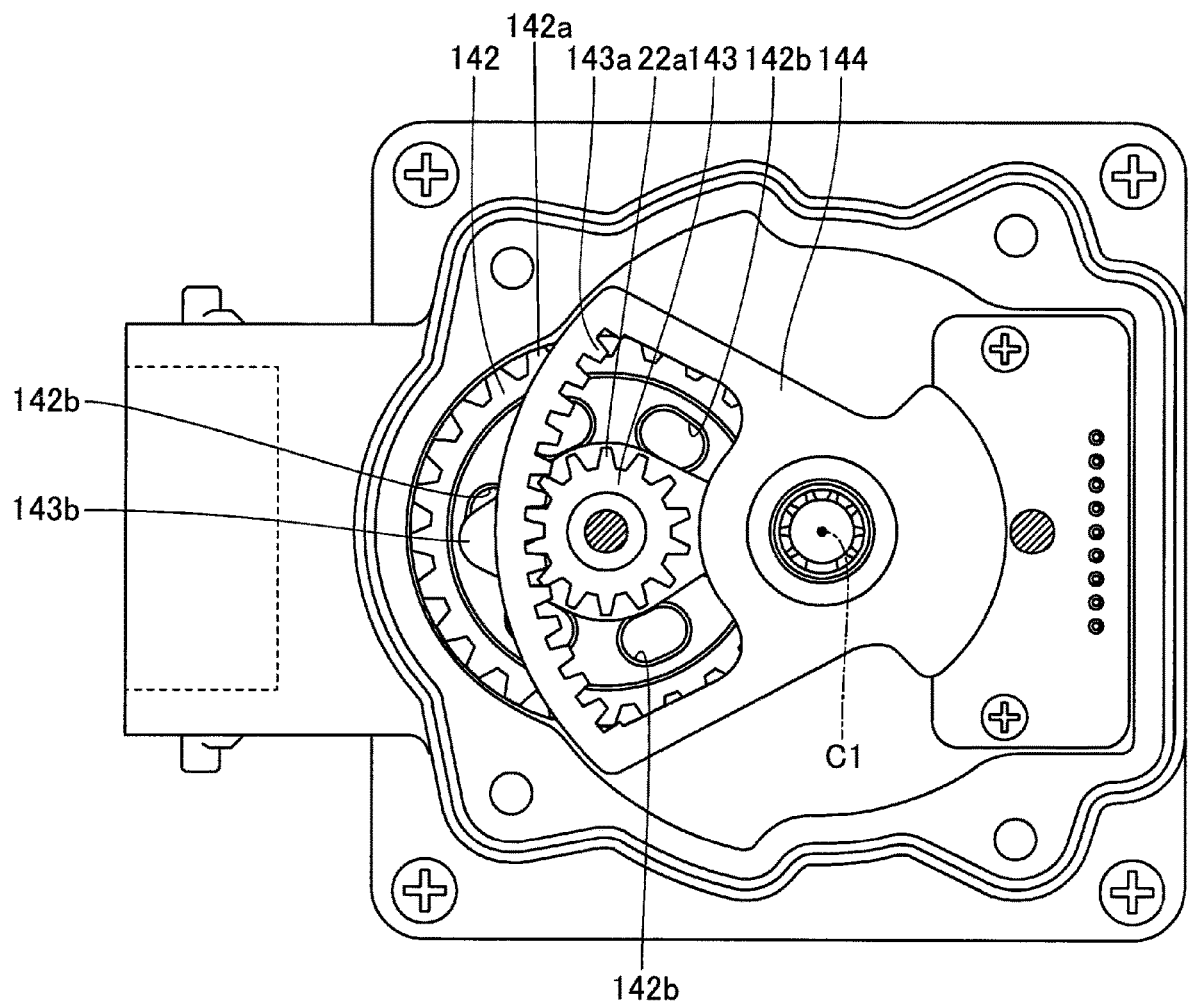
FIG. 5 is a diagram showing an internal structure of a speed reducing mechanism in a state in which a gear housing is removed from a main body portion in the actuator unit constituting the shift device according to the embodiment.

As shown in FIGS. 4 and 5, the driving force transmission mechanism 14 includes the speed reducing mechanism 14a. The speed reducing mechanism 14a is configured to rotate the detent plate 21 in a state in which a rotation speed transmitted from the motor 11 side is reduced. Specifically, the speed reducing mechanism 14a includes the gear portion 141 of the rotor 111, an intermediate gear 142 having a gear portion 142a that meshes with the gear portion 141, an intermediate gear 143 that is arranged on a lower surface side (Z2 side) at the same axis as the intermediate gear 142 and engages with the intermediate gear 142, and a final gear 144 having a gear portion 144a that meshes with a gear portion 143a of the intermediate gear 143.

Figure 6:
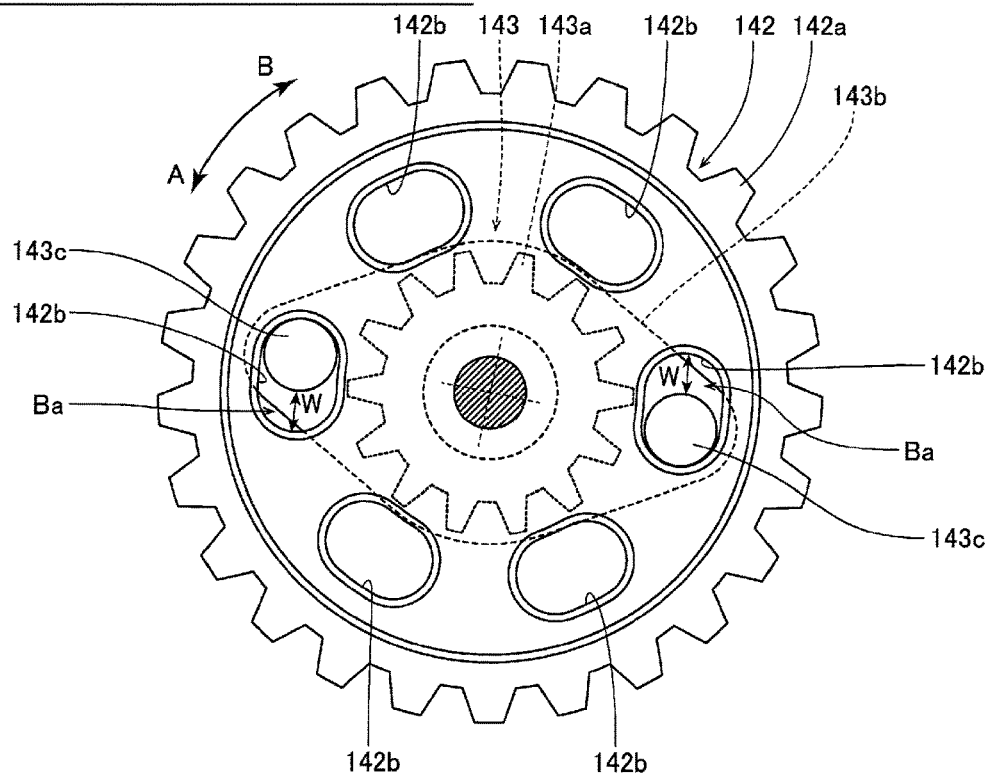
FIG. 6 is a diagram showing an engaged state (driving force transmittable state) of an intermediate gear in the actuator unit constituting the shift device according to the embodiment.
Figure 7:
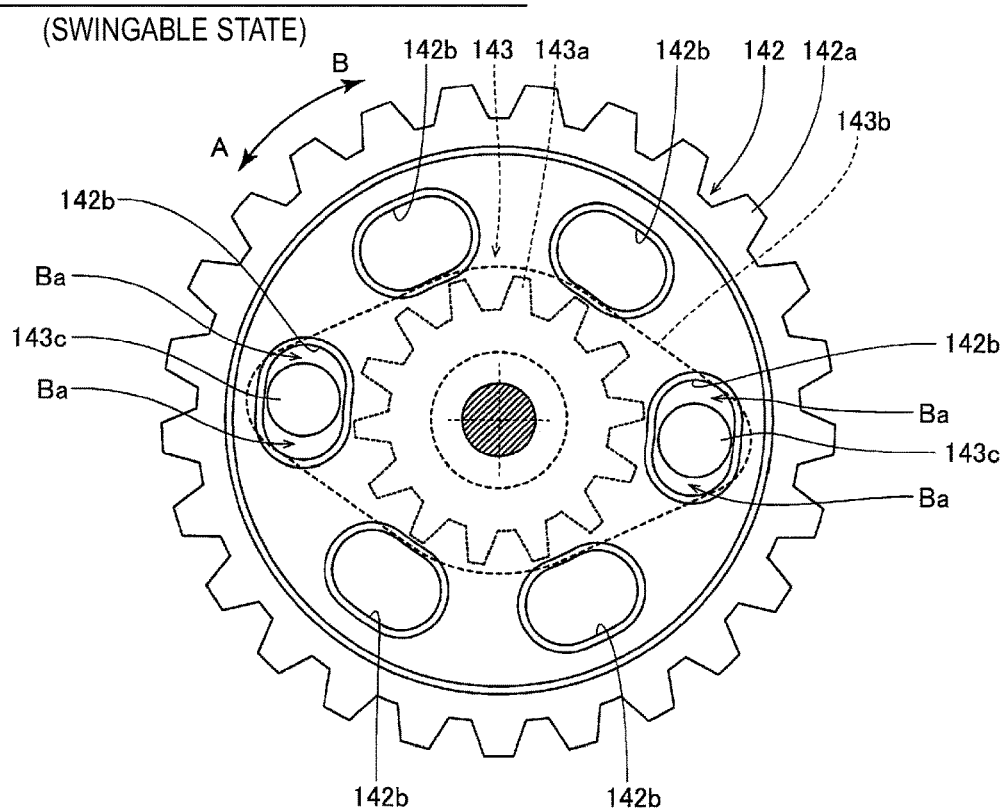
FIG. 7 is a diagram showing an engaged state (driving force non-transmission state) of the intermediate gear in the actuator unit constituting the shift device according to the embodiment.

Further, as shown in FIGS. 6 and 7, the intermediate gear 142 is formed with a plurality of (six) elongated holes 142b having a long diameter extending along a circumferential direction between a rotation center portion and an outer peripheral portion (gear portion 142a). The plurality of elongated holes 142b are arranged at intervals of 60 degrees in the circumferential direction. Further, the intermediate gear 143 has an elliptical main body portion 143b provided with the gear portion 143a, and is provided with a plurality of (two) cylindrical engaging convex portions 143c protruding upward from an upper surface (Z1 side) of the main body portion 143b opposite to the gear portion 143a. The engaging convex portions 143c are arranged on peripheral edges on both sides in a long diameter direction of the main body portion 143b. Then, in a state in which the intermediate gear 143 is arranged adjacent to the intermediate gear 142 from the lower side to the upper side (Z1 side), each of the engaging convex portions 143c arranged at an interval of 180 degrees is inserted (engaged) into each of the two elongated holes 142b of the corresponding intermediate gear 142.

In addition, the engaging convex portions 143c is fitted to the elongated hole 142b of the intermediate gear 142 with a backlash Ba having a predetermined size (a length in the circumferential direction). That is, relatively free rotation (free rotation) between the intermediate gear 142 and the intermediate gear 143 is allowed by the backlash Ba (predetermined angular width) in the circumferential direction generated in the engaging convex portion 143c and the elongated hole 142b that are fitted into each other. In addition, FIG. 6 shows a state in which a driving force can be transmitted from the intermediate gear 142 to the intermediate gear 143, and FIG. 7 shows a state in which the driving force cannot be transmitted from the intermediate gear 142 to the intermediate gear 143.

Next, the relationship between a movement of the shift position and an output value of the output shaft rotation angle sensor 13 and an output value of the rotor rotation angle sensor 12 will be described.

Figure 8:
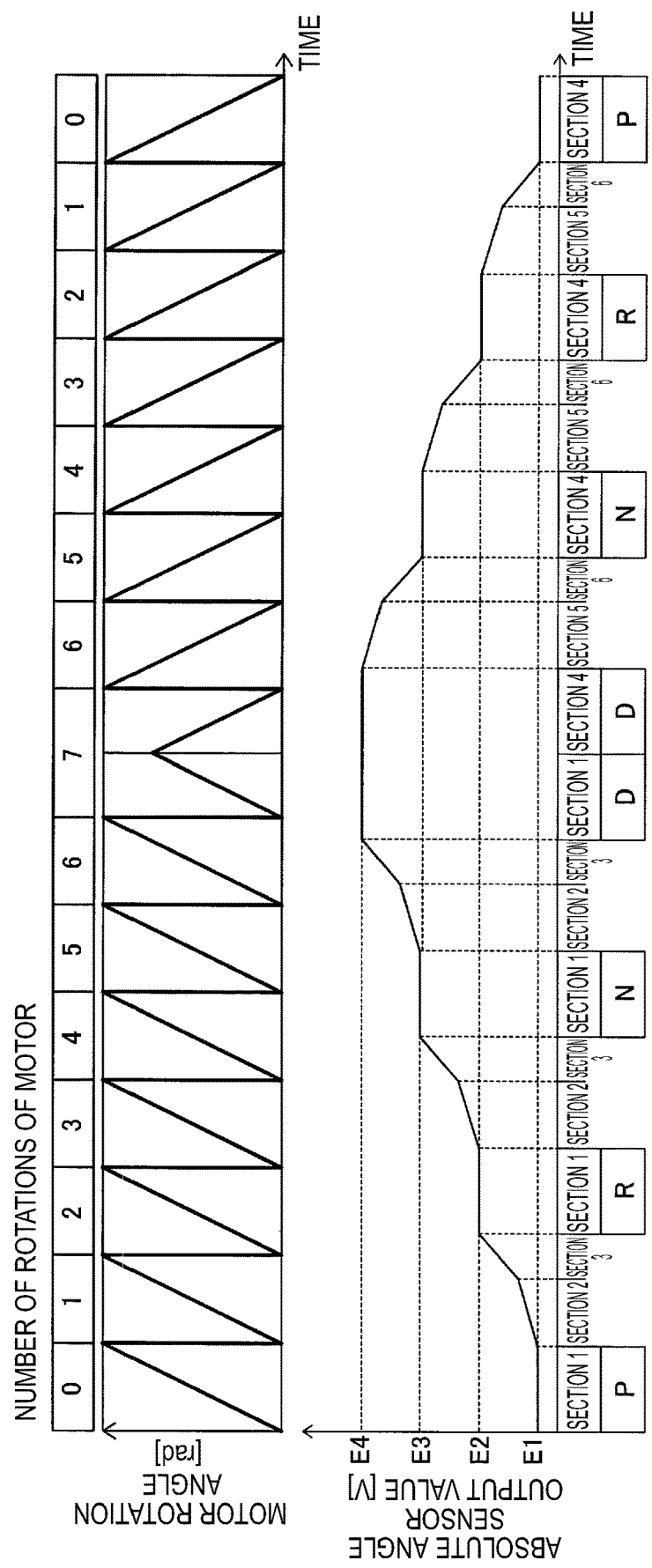
FIG. 8 is a diagram showing a relationship between an output value (output voltage) of an output shaft rotation angle sensor, an output value (motor rotation angle) of a rotor rotation angle sensor, and a number of rotations of a motor in the shift device according to the embodiment.

As shown in FIG. 8, as the number of rotations of the motor 11 (0 times, 1 time, 2 times, . . . , 7 times) increases, the detent plate 21 connected to the output shaft 17 rotates so that the shift position changes in an order of the P position, the R position, the N position, and the D position. At this time, the detent spring 22 is fitted into the valley portion 21a, the valley portion 21b, the valley portion 21c, and the valley portion 21d in this order. Then, the output value of the output shaft rotation angle sensor 13 increases as the number of rotations of the motor 11 increases.

Figure 9:
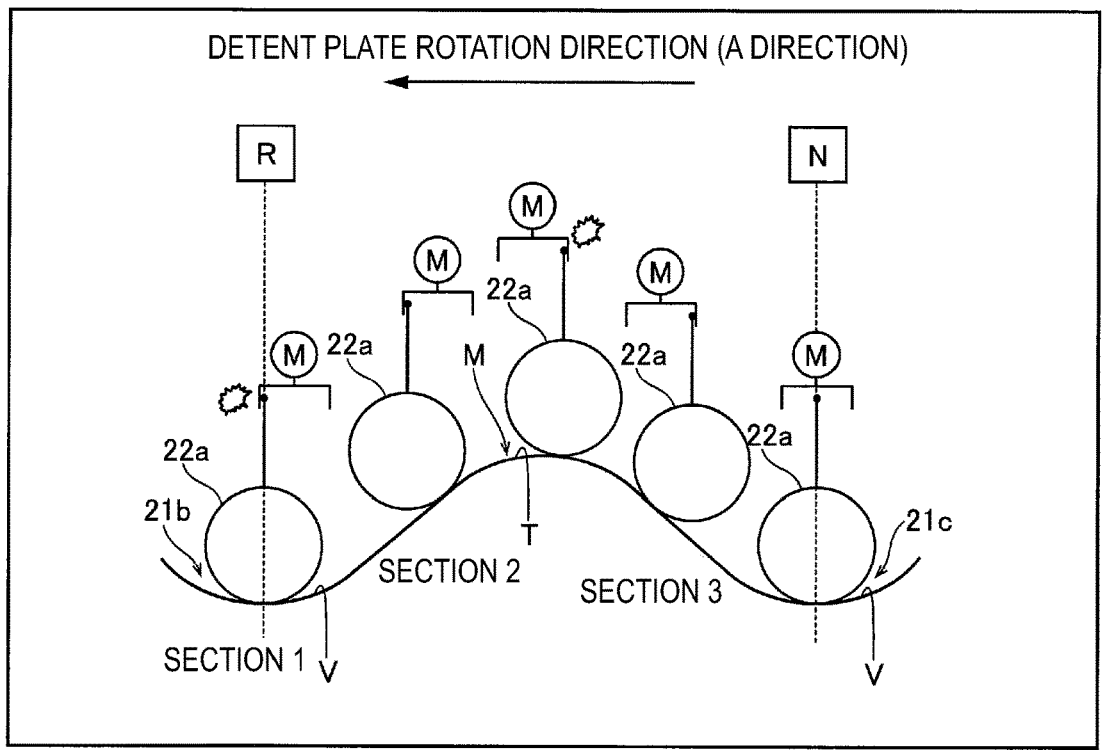
FIG. 9 is a schematic diagram showing a state when a roller portion of the shift device according to the embodiment moves from an R position to an N position.

For example, as shown in FIGS. 8 and 9, it is assumed that the roller portion 22a is currently fitted into the valley portion 21b (R position) (section 1). The motor 11 (see FIG. 1) is driven, so that the detent plate 21 is rotated in the direction of the arrow A via the speed reducing mechanism 14a (see FIG. 1). In addition, a predetermined amount of the backlash Ba (see FIG. 7) is provided between the intermediate gear 142 and the intermediate gear 143. Therefore, in a state in which the roller portion 22a is completely fitted into a valley bottom V of the valley portion 21b, the engaging convex portion 143c is engaged with the inside of the elongated hole 142b by utilizing the backlash Ba so as not to able to transmit the driving force although the intermediate gear 142 is rotated with a rotation of the rotor 111, and therefore the intermediate gear 143 is not rotated. As a result, in the section 1, while the rotation angle (rad) of the motor 11 detected by the rotor rotation angle sensor 12 (see FIG. 1) increases linearly, a voltage level corresponding to the rotation angle of the output shaft 17 detected by the output shaft rotation angle sensor 13 (see FIG. 1) is constant.

Then, in a section 2, one side end portion of the elongated hole 142b of the intermediate gear 142 is engaged with the engaging convex portion 143c of the intermediate gear 143 so that the driving force can be transmitted, and therefore the driving force of the motor 11 is transmitted to the output shaft 17 (see FIG. 2) via the gear portion 141, the intermediate gear 142, the intermediate gear 143, and the final gear 144 (see FIG. 4). At this time, the one side end portion of the elongated hole 142b of the intermediate gear 142 comes into contact with the engaging convex portion 143c of the intermediate gear 143, so that the one side end portion of the elongated hole 142b of the intermediate gear 142 wears. Then, as the detent plate 21 rotates in the direction of the arrow A, the roller portion 22a moves so as to climb a slope of the valley portion 21b (R position) on the valley portion 21c (N position) side toward the mountain portion M. In addition, in the section 2, the rotation angle (rad) of the motor 11 detected by the rotor rotation angle sensor 12 (see FIG. 1) increases linearly. Further, the voltage level corresponding to the rotation angle of the output shaft 17 detected by the output shaft rotation angle sensor 13 (see FIG. 1) increases at a constant rate.

Then, in a section 3, after the roller portion 22a climbs over the mountain portion M at a boundary between the valley portion 21b (R position) and the valley portion 21c (N position), the detent plate 21 is rotated ahead of the motor 11 (intermediate gear 142). That is, the detent plate 21 is always urged toward the valley portion 21b by the roller portion 22a, and therefore the detent plate 21 is rotated ahead of the motor 11 within a range of a size of the backlash Ba of the elongated hole 142b by the urging force. At this time, the other side end portion of the elongated hole 142b of the intermediate gear 142 comes into contact with the engaging convex portion 143c of the intermediate gear 143, so that the other side end portion of the elongated hole 142b of the intermediate gear 142 wears. Then, the roller portion 22a is dropped toward the valley bottom V of the valley portion 21c (see the section 3 in FIG. 9). At this time, while the rotation angle of the motor 11 increases, the voltage level corresponding to the rotation angle of the output shaft 17 sharply increases as the roller portion 22a drops (is sucked) into the valley bottom V.

In addition, an operation for a movement of the shift position from the P position to the R position and a movement from the N position to the D position are the same as the operation for the movement from the R position to the N position.

Figure 10:
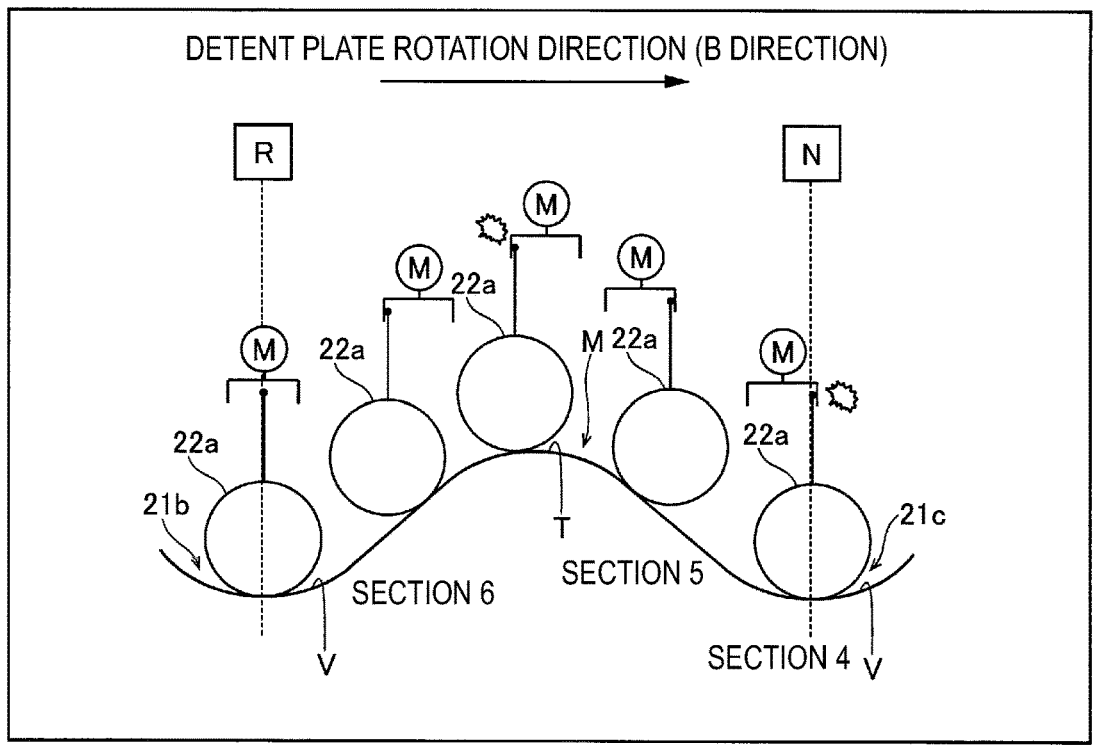
FIG. 10 is a schematic diagram showing a state when the roller portion of the shift device according to the embodiment moves from the N position to the R position.

Further, as shown in FIGS. 8 and 10, when a rotation direction of the motor 11 is reversed, the shift position is moved to the R position via the N position (section 4), a section 5, and a section 6.

In addition, the operation of the N position (section 4) is the same as the operation of the section 1. That is, while the rotation angle (rad) of the motor 11 detected by the rotor rotation angle sensor 12 (see FIG. 1) decreases linearly, the voltage level corresponding to the rotation angle of the output shaft 17 detected by the output shaft rotation angle sensor 13 (see FIG. 1) is constant.

Further, the operation of the section 5 is the same as the operation of the section 2. That is, in the section 5, the rotation angle of the motor 11 decreases linearly, and the voltage level corresponding to the rotation angle of the output shaft 17 decreases at a constant rate. At this time, the other side end portion of the elongated hole 142b of the intermediate gear 142 comes into contact with the engaging convex portion 143c of the intermediate gear 143, so that the other side end portion of the elongated hole 142b of the intermediate gear 142 wears.

Further, the operation of the section 6 is the same as the operation of the section 3. That is, while the rotation angle of the motor 11 decreases, the voltage level corresponding to the rotation angle of the output shaft 17 sharply decreases as the roller portion 22a drops (is sucked) into the valley bottom V. At this time, the one side end portion of the elongated hole 142b of the intermediate gear 142 comes into contact with the engaging convex portion 143c of the intermediate gear 143, so that the one side end portion of the elongated hole 142b of the intermediate gear 142 wears.

Figure 11:
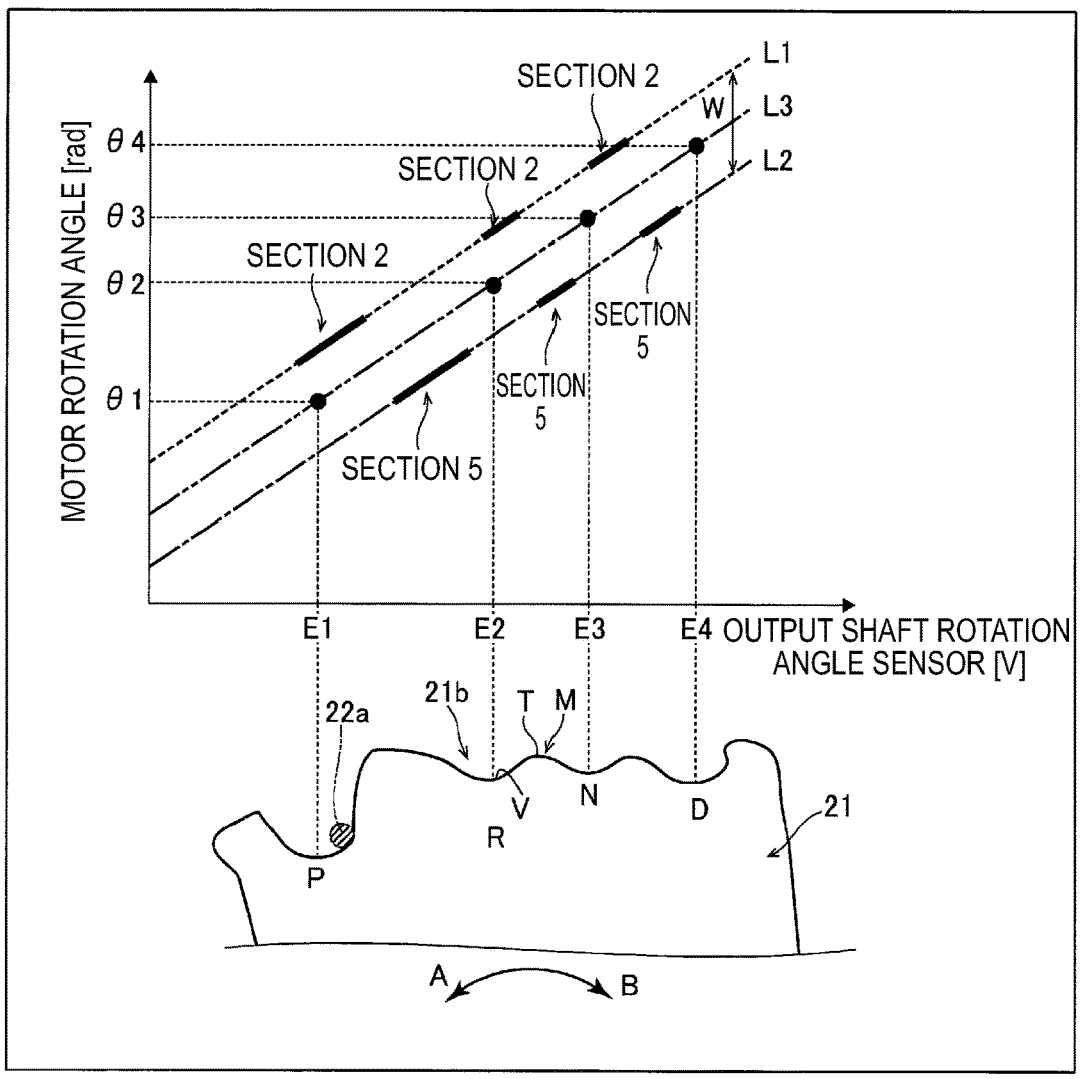
FIG. 11 is a diagram showing a relationship between a first estimated value, a second estimated value, and a center of backlash in the shift device according to the embodiment.

Here, as shown in FIG. 11, in the shift device 100, for example, at the time of factory shipment, the rotation angle of the motor 11 (rotor 111) corresponding to the valley bottom V is obtained (learned) for each shift device 100. The graph shown in FIG. 11 is a graph showing a relationship between the voltage (V) and the rotation angle (rad) with the output value (voltage) of the output shaft rotation angle sensor 13 as a horizontal axis and the output value (rotation angle) of the rotor rotation angle sensor 12 as a vertical axis. In addition, the vertical axis actually represents an integrated value of the rotation angle of the motor 11 (that is, $2\pi \times$ the number of rotations of the motor 11+the rotation angle).

The obtaining (learning) of the rotation angle of the motor 11 (rotor 111) corresponding to the valley bottom V (a center Cp of the backlash Ba) at each of the plurality of shift positions (the P position, the R position, the N position and the D position) will be described below. In addition, the rotation angle of the motor 11 corresponding to the valley bottom V is obtained by, for example, the ECU 15.

That is, the detent spring 22 (roller portion 22a) is moved so as to continuously pass through the valley portion 21a, the valley portion 21b, the valley portion 21c, and the valley portion 21d. Then, a backlash width W included in the speed reducing mechanism 14a is detected based on the output value of the output shaft rotation angle sensor 13 and the output value of the rotor rotation angle sensor 12 while the detent spring 22 is being moved.

Specifically, the detent spring 22 is continuously moved in an order of the P position, the R position, the N position, the D position, the N position, the R position, and the P position. The output value of the output shaft rotation angle sensor 13 and the output value of the rotor rotation angle sensor 12 detected in a forward path in which the detent spring 22 moves in an order of the P position, the R position, the N position, and the D position are represented by thick lines on a straight line L1 in FIG. 11. Further, the output value of the output shaft rotation angle sensor 13 and the output value of the rotor rotation angle sensor 12 detected in a return path in which the detent spring 22 moves in an order of the D position, the N position, the R position, and the P position are represented by thick lines on a straight line L2 in FIG. 11.

Then, the ECU 15 detects the backlash width W of the backlash Ba included in the speed reducing mechanism 14a based on the output value of the output shaft rotation angle sensor 13 and the output value of the rotor rotation angle sensor 12 in moving sections (the section 1, the section 2 and the section 5).

Here, the moving sections mean sections in which the detent spring 22 moves through each of the valley bottoms V of the plurality of valley portions 21a, 21b, 21c, and 21d of the detent plate 21, and the top portions T of the mountain portions M. In the moving sections, the backlash Ba between the intermediate gear 142 and the intermediate gear 143 is reduced, and the intermediate gear 143 rotates with the rotation of the intermediate gear 142.

Further, the backlash width W means a backlash width W (see FIG. 6) between the engaging convex portion 143c and the elongated hole 142b in a state in which the backlash Ba is reduced (the state in which the driving force can be transmitted from the intermediate gear 142 to the intermediate gear 143).

The section 2 includes a section 2 when the detent spring 22 moves from the P position to the R position, a section 2 when the detent spring 22 moves from the R position to the N position, and a section 2 when the detent spring 22 moves from the N position to the D position. Further, the section 5 includes a section 5 when the detent spring 22 moves from the D position to the N position, a section 5 when the detent spring 22 moves from the N position to the R position, and a section 5 when the detent spring 22 moves from the R position to the P position.

The ECU 15 is configured to perform control for obtaining the straight line L1 by a linear approximation of the output value of the rotor rotation angle sensor 12 with respect to the output value of the output shaft rotation angle sensor 13 in a plurality of moving sections (three sections 2 and the thick lines on the straight line L1 in FIG. 11) when the motor 11 is rotated in the direction of the arrow A. That is, a slope a1 and an intercept 131 of the straight line L1 are calculated.

The ECU 15 is configured to perform control for obtaining the straight line L2 by a linear approximation of the output value of the rotor rotation angle sensor 12 with respect to the output value of the output shaft rotation angle sensor 13 in a plurality of moving sections (three sections 5 and the thick lines on the straight line L2 in FIG. 11) when the motor 11 is rotated in the direction of the arrow B. That is, a slope a2 and an intercept b2 of the straight line L2 are calculated.

The ECU 15 detects a width between the straight line L1 obtained by the linear approximation and the straight line L2 obtained by the linear approximation as the backlash width W. That is, since a predetermined amount of the backlash Ba is provided in advance between the intermediate gear 142 and the intermediate gear 143, even the same output value of the output shaft rotation angle sensor 13 (horizontal axis) causes a difference in the rotation angle of the motor 11 (vertical axis). Then, this difference can be regarded as the backlash width W.

The ECU 15 is configured to perform control for obtaining the rotation angle of the motor 11 corresponding to the center Cp of the backlash Ba based on the detected backlash width W. Specifically, the ECU 15 is configured to perform control for obtaining a straight line L3 as the center Cp of the backlash Ba passing through the center between the straight line L1 and the straight line L2 as the rotation angle of the motor 11 corresponding to the center Cp of the backlash Ba. That is, a slope (hereinafter, referred to as a3) and an intercept (hereinafter, referred to as b3) of the straight line L3 are calculated.

Then, based on the relationship between the rotation angle of the motor 11 corresponding to the calculated center Cp of the backlash Ba and the output value of the output shaft rotation angle sensor 13 corresponding to any of the valley bottoms V of the valley portion 21a, the valley portion 21b, the valley portion 21c and the valley portion 21d, the rotation angle of the motor 11 corresponding to the center Cp of the backlash Ba is obtained. Specifically, the output values of the output shaft rotation angle sensor 13 in a plurality of sections 1 (sections 1 corresponding to the P position, the R position, the N position, and the D position) when the motor 11 is rotated in the direction of the arrow A are obtained. In addition, the output value of the output shaft rotation angle sensor 13 in each of the plurality of sections 1 is a constant value. Specifically, the output values of the output shaft rotation angle sensor 13 corresponding to the P position, the R position, the N position, and the D position are an output value E1, an output value E2, an output value E3, and an output value E4, respectively.

Further, the output values of the output shaft rotation angle sensor 13 in a plurality of sections 4 (sections 4 corresponding to the D position, the N position, the R position, and the P position) when the motor 11 is rotated in the direction of the arrow B are obtained. In addition, the output value of the output shaft rotation angle sensor 13 in each of the plurality of sections 4 is a constant value. Specifically, the output values of the output shaft rotation angle sensor 13 corresponding to the D position, the N position, the R position, and the P position are the output value E4, the output value E3, the output value E2, and the output value E1, respectively. That is, the output value of the output shaft rotation angle sensor 13 in the section 1 and the output value of the output shaft rotation angle sensor 13 in the section 4 at the same shift position are substantially the same.

Then, in the straight line L3, the rotation angle of the motor 11 corresponding to the section 1 (or the section 4) is obtained. Specifically, a rotation angle θ1, a rotation angle θ2, a rotation angle θ3, and a rotation angle θ4 of the motor 11 corresponding to the output value E1, the output value E2, the output value E3, and the output value E4 of the output shaft rotation angle sensor 13, respectively, are obtained. As a result, the rotation angle θ1, the rotation angle θ2, the rotation angle θ3, and the rotation angle θ4 of the motor 11 corresponding to the valley bottoms V (the center Cp of the backlash Ba) of the P position, the R position, the N position, and the D position are obtained, respectively. Here, the rotation angle A1, the rotation angle 92, the rotation angle θ3, and the rotation angle θ4 of the motor 11 are rotation angles of the motor 11 that cause the detent spring 22 to reach the valley bottom V of the valley portion 21a, the valley bottom V of the valley portion 21b, the valley bottom V of the valley portion 21c, and the valley bottom V of the valley portion 21d of the detent plate 21, respectively.

Then, the slopes (a1, a2 and a3) and the intercepts (b1, b2 and b3) of the straight line L1, the straight line L2, and the straight line L3, and the output values (E1, E2, E3 and E4) of the output shaft rotation angle sensor 13 and the rotation angles (θ1, θ2, θ3, and θ4) of the motor 11 corresponding to the valley bottoms V (the centers Cp of backlash Ba) of the P position, the R position, the N position, and the D position are stored in the storage unit 16.

(Correction of Valley Bottom Position Corresponding to Shift Position)

As shown in FIGS. 12 to 16, the ECU 15 of the present embodiment is configured to correct a deviation Ga from the center Cp of a preset backlash Ba when a current backlash width Wp included in the speed reducing mechanism 14a detected based on the output value of the output shaft rotation angle sensor 13 and the output value of the rotor rotation angle sensor 12 is equal to or greater than a predetermined value during the shift switching operation. That is, the ECU 15 is configured to perform control for correcting the deviation Ga between the center Cp of the backlash Ba corresponding to each valley bottom V of an initial (preset) P position, R position, N position, and D position and a center Cr of the backlash Ba corresponding to each valley bottom V of a current P position, R position, N position, and D position, which is caused by an increase in the backlash width W (an initial backlash width Wi) due to wear (aged wear) of at least one of the one side end portion and the other side end portion of the elongated hole 142b of the intermediate gear 142.

Specifically, the ECU 15 is configured to correct the deviation Ga from the center Cp of the preset backlash Ba when the current backlash width Wp included in the speed reducing mechanism 14a detected based on the output value of the output shaft rotation angle sensor 13 and the output value of the rotor rotation angle sensor 12 is equal to or greater than the predetermined value during the shift switching operation.

Hereinafter, an increase of the initial backlash width W will be described, and for the simplification of description, a case where only one side end portion of the elongated hole 142b of the intermediate gear 142 wears will be described as an example. Actually, the other side end portion of the elongated hole 142b of the intermediate gear 142 also wears.

Figure 12:
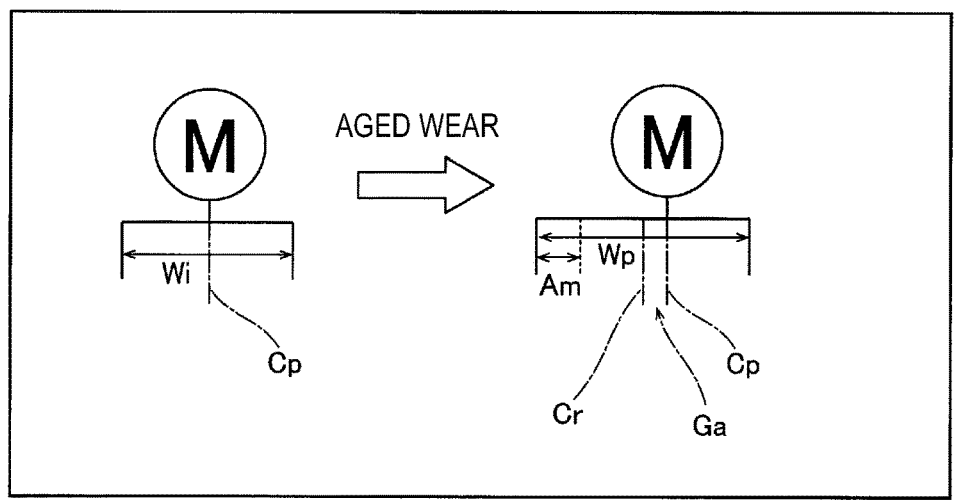
FIG. 12 is an explanatory diagram showing a deviation of the center of backlash of a driving force transmission mechanism of the shift device according to the embodiment.
Figure 13:
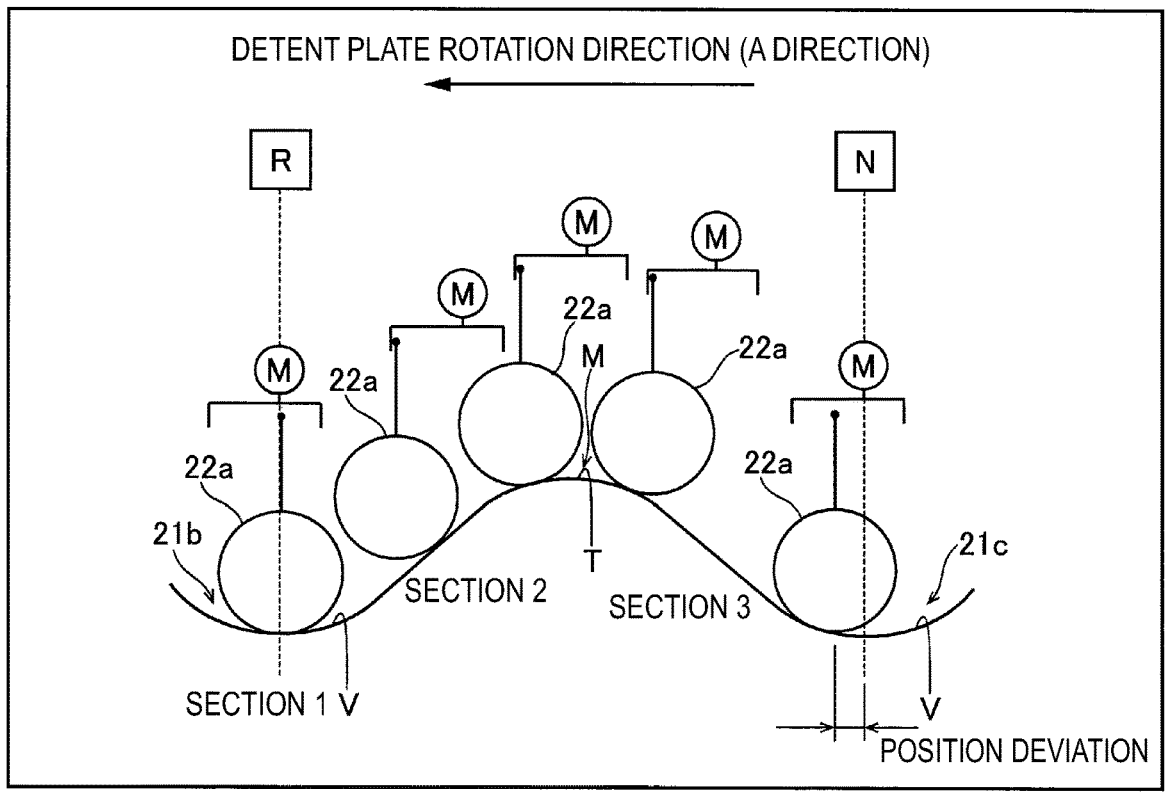
FIG. 13 is an explanatory diagram showing a movement of a detent spring when a deviation of the center of backlash is not corrected in the shift device according to the embodiment.

As shown in FIGS. 12 and 13, a width of the elongated hole 142b of the intermediate gear 142 increases due to aged wear caused by contact of the intermediate gear 143 with the engaging convex portion 143c. That is, a position of the one side end portion of the elongated hole 142b of the intermediate gear 142 is set away from an initial position of the one side end portion of the elongated hole 142b of the intermediate gear 142. Accordingly, the current backlash width Wp of the elongated hole 142b of the intermediate gear 142 is greater than the initial backlash width WI of the elongated hole 142b of the intermediate gear 142. As a result, a deviation Ga occurs between the center Cp of the initial backlash Ba and the center Cr of the backlash Ba after aged wear. Further, as the initial backlash width WI increases, the following may occur.

For example, when switching from the R position to the N position, the ECU 15 performs control for rotating the rotor 111 by an amount necessary for the roller portion 22a to move from the valley portion 21b (the R position) toward the valley portion 21c (the N position). Here, in the section 3, the rotor 111 rotates to a position where the roller portion 22a climbs over the mountain portion M at the boundary between the valley portion 21b (the R position) and the valley portion 21c (the N position); however, due to the increase in the backlash width W, the roller portion 22a may not actually move to the position where the roller portion 22a climbs over the mountain portion M at the boundary between the valley portion 21b (the R position) and the valley portion 21c (the N position).

In this case, the roller portion 22a stops in the middle of the valley portion 21c without dropping into the valley bottom V of the valley portion 21b. As a result, the output shaft 17 cannot be moved to the valley bottom V, so that an accuracy of position control of the shift position is lowered.

Therefore, the ECU 15 is configured to correct the deviation Ga from the center Cp of the preset backlash Ba based on a deviation Ga between the position of the valley bottom V of the valley portion 21b of a shift switching member and the center Cp of the preset backlash Ba during the shift switching operation. That is, the ECU 15 is configured to perform control for measuring an increase amount Am of the backlash width W due to the increase of the backlash width W, and offsetting the position of the center Cp of the backlash Ba corresponding to the valley bottom V of each of the initial P position, R position, N position, and D position by the increase amount Am.

As an example, a measurement of the increase amount Am of the backlash width W at the R position will be described with reference to FIGS. 14 to 16. Further, in this example, for the simplification of description, it is assumed that only one side end portion of the elongated hole 142b of the intermediate gear 142 wears. In addition, the increase amount Am of the backlash width W can be measured not only at the R position but also at the P position, the N position, and the D position by the same method.

Figure 14:
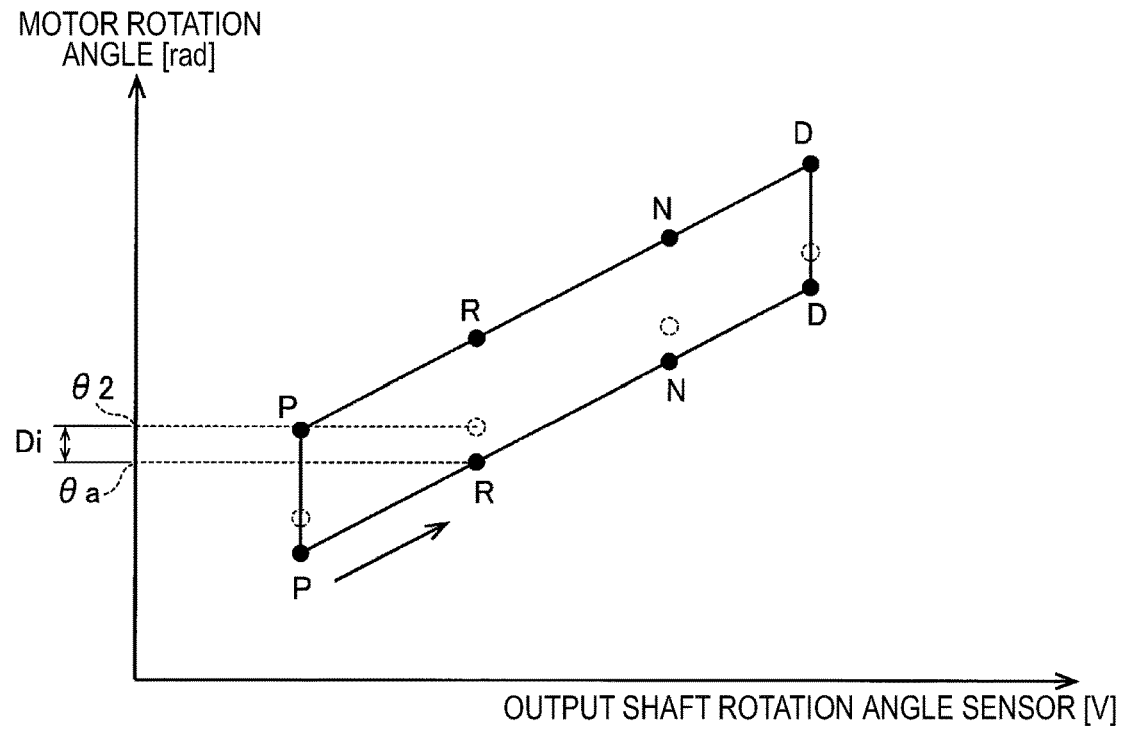
FIG. 14 is a diagram showing measurement of a first rotation angle of the shift device according to the embodiment.

As shown in FIG. 14, the ECU 15 is configured to perform control for obtaining a first rotation angle θa that is a rotation angle of the motor 11 at the R position (a predetermined shift position) when the detent plate 21 is rotated in the A direction. Here, the predetermined shift position indicates a shift position when the first rotation angle θa is obtained.

Then, the ECU 15 is configured to perform control for determining whether a difference Di between an initial rotation angle θ2 of the rotor 111 measured by the rotor rotation angle sensor 12 corresponding to the valley bottom V of the valley portion 21b at the R position when the detent plate 21 is rotated in the A direction and the first rotation angle θa is equal to or greater than a threshold value. The ECU 15 is configured to perform control for storing the first rotation angle θa in the storage unit 16 based on the difference Di between the initial rotation angle θ2 of the rotor 111 and the first rotation angle θa being equal to or greater than the threshold value. Further, the ECU 15 is configured to perform control for storing in the storage unit 16 that the difference Di between the initial rotation angle θ2 of the rotor 111 and the first rotation angle θa is equal to or greater than the threshold value.

Figure 15:
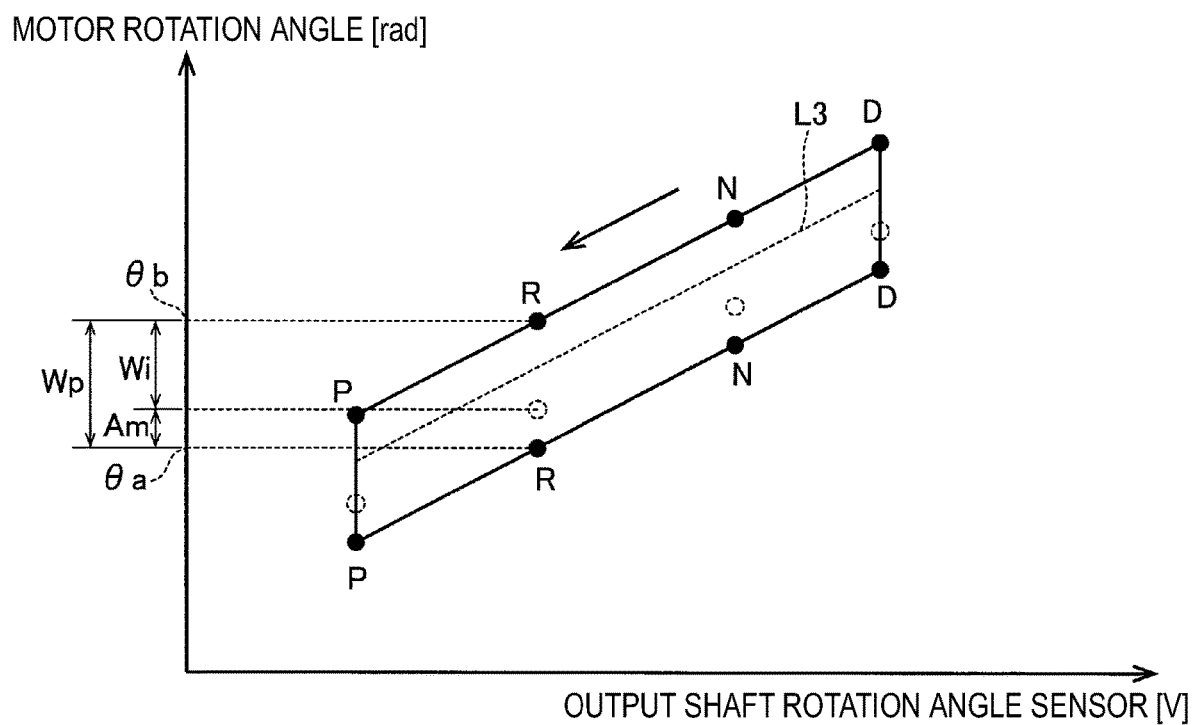
FIG. 15 is a diagram showing measurement of a current backlash width of the shift device according to the embodiment.

As shown in FIG. 15, the ECU 15 is configured to perform control for obtaining the current backlash width Wp based on the output values of the output shaft rotation angle sensor 13 and the output values of the rotor rotation angle sensor 12 in the moving sections in which the detent spring 22 moves from the valley bottom V of the valley portion 21b of the shift switching member to the top portion T of the mountain portion M when the detent plate 21 is rotated in the A direction and when the detent plate 21 is rotated in the B direction opposite to the A direction.

Specifically, the ECU 15 is configured to perform control for obtaining a second rotation angle θb that is a rotor rotation angle at the R position (the predetermined shift position) in the case where the difference between the initial rotation angle A2 of the rotor 111 and the first rotation angle θa is equal to or greater than the threshold value when the detent plate 21 is rotated in the B direction.

Further, the ECU 15 is configured to perform control for obtaining the current backlash width Wp based on a difference between the first rotation angle θa and the second rotation angle θb. That is, the ECU 15 is configured to perform control for obtaining the current backlash width Wp based on the difference between the first rotation angle θa of the rotor 111 measured by the rotor rotation angle sensor 12 corresponding to the valley bottom V of the valley portion 21b at the R position (the predetermined shift position) when the detent plate 21 is rotated in the A direction and the second rotation angle θb of the rotor 111 measured by the rotor rotation angle sensor 12 corresponding to the valley bottom V of the valley portion 21b at the R position (the predetermined shift position) when the shift switching member is rotated in the B direction.

The ECU 15 is configured to perform control for correcting the straight line L3 stored in the storage unit 16 based on the current backlash width Wp being equal to or greater than the predetermined value. That is, the ECU 15 is configured to perform control for obtaining the increase amount Am of the backlash width W based on a difference between the initial backlash width Wi and the current backlash width Wp. Here, the ECU 15 is configured to perform control for obtaining the initial backlash width Wi at the R position based on the straight line L1, the straight line L2, and the output value E2 of the output shaft rotation angle sensor 13 stored in the storage unit 16.

Figure 16:
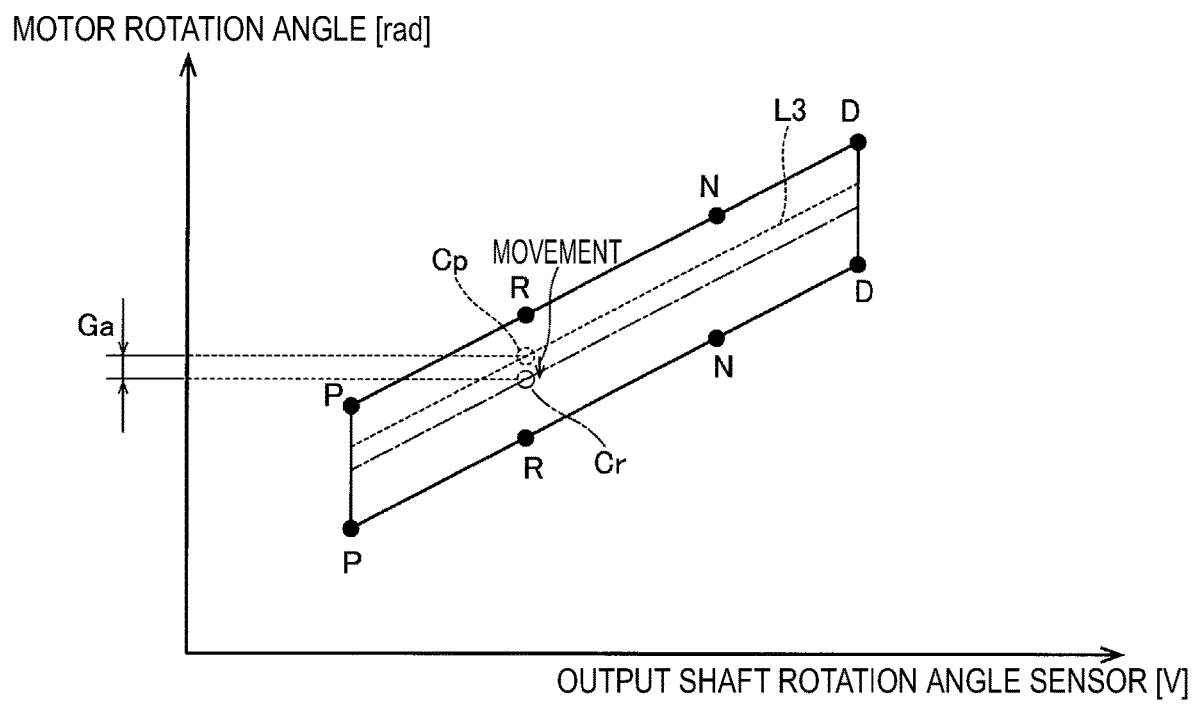
FIG. 16 is a diagram showing correction of the center of backlash of the shift device according to the embodiment.

As shown in FIG. 16, the ECU 15 is configured to correct the deviation Ga from the center Cp of the preset backlash Ba based on the increase amount Am of the current backlash width Wp with respect to the initial backlash width Wi. That is, the ECU 15 is configured to correct the deviation Ga from the center Cp of the preset backlash Ba based on the increase amount Am of the current backlash width Wp with respect to the initial backlash width Wi. Specifically, the ECU 15 is configured to offset the center Cp of the preset backlash Ba by the increase amount Am of the current backlash width Wp as the deviation Ga from the center Cp of the preset backlash Ba based on the increase amount Am of the current backlash width Wp with respect to the initial backlash width Wi. In this case, the rotation angle θ2 of the motor 11 corresponding to the center Cp of the preset backlash Ba becomes smaller by the increase amount Am of the current backlash width Wp. Then, the ECU 15 is configured to perform control for obtaining a center value of the current backlash width Wp obtained by offsetting by the increase amount Am as the center Cr of a corrected new backlash Ba.

That is, the ECU 15 is configured to perform control for correcting the straight line L3 based on the increase amount Am of the current backlash width Wp. Specifically, the ECU 15 is configured to perform control for offsetting the intercept b3 of the straight line L3 while maintaining the slope a3 of the straight line L3 by the increase amount Am of the current backlash width Wp. In this case, the value of the intercept b3 of the straight line L3 becomes smaller. Accordingly, the straight line L3 moves by the increase amount Am of the current backlash width Wp.

As described above, the ECU 15 is configured to obtain the current backlash width Wp based on the difference between the first rotation angle θa and the second rotation angle θb when the difference Di between the initial rotation angle θ2 of the rotor 111 measured by the rotor rotation angle sensor 12 corresponding to the valley bottom V of the valley portion 21b at the predetermined shift position when the detent plate 21 is rotated in the A direction and the first rotation angle θa is equal to or greater than the threshold value, and to obtain a center value of the obtained current backlash width Wp as the center Cr of a corrected new backlash Ba.

The control for correcting the center value of the initial backlash width Wi is performed every time a shift position switching operation is performed. That is, the ECU 15 is configured to obtain the current backlash width Wp based on the output value of the output shaft rotation angle sensor 13 and the output value of the rotor rotation angle sensor 12 each time a shift switching operation is performed, and to correct the deviation Ga from the center Cp of the preset backlash Ba when the current backlash width Wp is equal to or greater than the predetermined value.

(Backlash Center Position Correction Process)

Hereinafter, a backlash center position correction process by the ECU 15 will be described with reference to FIG. 17. The backlash center position correction process is a process of correcting a center position of the backlash Ba to an appropriate position in accordance with an increase in the backlash width W.

In step S1, the ECU 15 determines whether the shift position is switched by rotating the detent plate 21 in either the A direction or the B direction. That is, the ECU 15 determines whether the shift position is switched to any of the predetermined shift positions of the P position, the R position, the N position, and the D position. If the shift position is switched, the process proceeds to step S2, and if the shift position is not switched, step S1 is repeated.

In step S2, the ECU 15 obtains the first rotation angle θa of the rotor 111 at any of the predetermined shift position. In step S3, the ECU 15 obtains the difference Di between the obtained first rotation angle θa and any of the initial rotation angle θ1, the initial rotation angle θ2, the initial rotation angle θ3, and the initial rotation angle θ4 corresponding to the predetermined shift positions. In step S4, the ECU 15 determines whether the difference Di is equal to or greater than a threshold value. If the difference Di is equal to or greater than the threshold value, the process proceeds to step S5, and if the difference Di is less than the threshold value, the process returns to step S1.

In step S5, the ECU 15 stores the first rotation angle θa in the storage unit 16 and also stores that the difference Di at any of the predetermined shift positions is equal to or greater than the threshold value. In step S6, the ECU 15 determines whether the shift position is switched to any of the predetermined shift positions by rotating the detent plate 21 in a direction opposite to the rotation direction in step S1. Then, if the shift position is switched to any of the predetermined shift positions, the process proceeds to step S7, and if the shift position is not switched to any of the predetermined shift positions, repeat step S6 is repeated.

In step S7, the ECU 15 obtains the second rotation angle θb as the rotation angle of the rotor 111 at any of the predetermined shift positions. In step S8, the ECU 15 obtains the current backlash width Wp based on the difference between the first rotation angle θa and the second rotation angle θb. In step S9, the ECU 15 obtains the increase amount Am of the current backlash width Wp based on the difference between the initial backlash width Wi and the current backlash width Wp. In step S10, the ECU 15 offsets the center Cp of the backlash Ba by the increase amount Am of the current backlash width Wp. That is, in the ECU 15, the intercept b3 of the straight line L3 is offset by the increase amount Am of the current backlash width Wp. Then, after step S10, the backlash center position correction process is completed.

(Effect of Present Embodiment)

In the present embodiment, the following effect can be obtained.

In the present embodiment, as described above, the shift device 100 is provided with the detent plate 21 including the valley portion 21a, the valley portion 21b, the valley portion 21c, and the valley portion 21d provided so as to correspond to the shift positions, and the detent spring 22 for establishing a shift position while being fitted into any one of the plurality of valley portions 21a, 21b, 21c, and 21d of the detent plate 21. The ECU 15 is configured to correct the deviation Ga from the center Cp of a preset backlash Ba when the current backlash width Wp included in the driving force transmission mechanism 14 detected based on the output value of the output shaft rotation angle sensor 13 and the output value of the rotor rotation angle sensor 12 is equal to or greater than the predetermined value during the shift switching operation. Accordingly, by correcting the deviation Ga from the center Cp of the preset backlash Ba, the positions of the center Cp of the backlash Ba corresponding to the positions of the valley bottoms V of the valley portion 21a, the valley portion 21b, the valley portion 21c, and the valley portion 21d of the detent plate 21 can be corrected without pressing the detent spring 22 against a wall of the detent plate 21, so that the rotation angle of the motor 11 corresponding to the position of the center Cr of the corrected backlash Ba can be obtained. As a result, it is possible to correct the rotation angle of the motor 11 that causes the detent spring 22 to reach the valley bottoms V of the valley portion 21*a*, the valley portion 21*b*, the valley portion 21*c*, and the valley portion 21*d* of the detent plate 21 without applying an excessive load to the detent spring 22. Further, during the shift switching operation, by correcting the deviation from the center Cp of the preset backlash Ba, the center Cp of the preset backlash Ba can be corrected in accordance with the center Cr of the backlash Ba caused by a backlash width Wr included in the driving force transmission mechanism 14 that increases due to aged wear, so that a state in which the center Cr of the backlash Ba matches with the positions of the valley bottoms V of the plurality of valley portions 21*a*, 21*b*, 21*c*, and 21*d* of the detent plate 21 can be maintained. As a result, it is possible to prevent a decrease in the accuracy of the position control of the detent spring 22 during the shift switching operation.

Further, in the present embodiment, as described above, the ECU 15 is configured to correct the deviation Ga from the center Cp of the preset backlash Ba based on the deviation Ga between the position of the valley bottom V of any one of the valley portion 21*a*, the valley portion 21*b*, the valley portion 21*c*, and the valley portion 21*d* of the detent plate 21 and the center Cp of the preset backlash Ba during the shift switching operation. Accordingly, by correcting the deviation Ga from the center Cp of the preset backlash Ba, the center Cr of the backlash Ba can be accurately matched with the positions of the valley bottoms V of the plurality of valley portions 21*a*, 21*b*, 21*c*, and 21*d* of the detent plate 21, so that the position control of the detent spring 22 during the shift switching operation can be accurately performed and a decrease in a determination accuracy of the shift position can be prevented.

Further, in the present embodiment, as described above, the ECU 15 is configured to correct the deviation Ga from the center Cp of the preset backlash Ba based on the increase amount Am of the current backlash width Wp with respect to the initial backlash width Wi. Accordingly, the deviation Ga caused by the increase in the backlash width W due to wear of the backlash Ba of the driving force transmission mechanism 14 can be corrected, so that the state in which the center Cr of the backlash Ba matches with the positions of the valley bottoms V of the valley portion 21*a*, the valley portion 21*b*, the valley portion 21*c*, and the valley portion 21*d* of the detent plate 21 can be maintained. As a result, it is possible to prevent a decrease in the accuracy of the position control of the detent spring 22 during the shift switching operation.

Further, in the present embodiment, as described above, the ECU 15 is configured to offset the center Cp of the preset backlash Ba by the increase amount Am of the backlash width W as the deviation Ga from the center Cp of the preset backlash Ba based on the increase amount Am of the current backlash width Wp with respect to the initial backlash width Wi. Accordingly, by offsetting the center Cp of the preset backlash Ba in accordance with the increase amount Am of the current backlash width Wp caused by wear of the backlash Ba of the driving force transmission mechanism 14, the deviation Ga between the center Cp of the preset backlash Ba and the positions of the valley bottoms V of the valley portion 21*a*, the valley portion 21*b*, the valley portion 21*c*, and the valley portion 21*d* of the detent plate 21 can be compensated. As a result, the state in which the center Cr of the backlash Ba matches with the positions of the valley bottoms V of the valley portion 21*a*, the valley portion 21*b*, the valley portion 21*c*, and the valley portion 21*d* of the detent plate 21 can be maintained, so that a decrease in the accuracy of the position control of the detent spring 22 during the shift switching operation can be prevented.

Further, in the present embodiment, as described above, the ECU 15 is configured to obtain the current backlash width Wp based on the output value of the output shaft rotation angle sensor 13 and the output value of the rotor rotation angle sensor 12 in the moving sections in which the detent spring 22 moves from the valley bottom V of any of the valley portion 21*a*, the valley portion 21*b*, the valley portion 21*c*, and the valley portion 21*d* of the detent plate 21 to the top portion T of the mountain portion M when the detent plate 21 is rotated in the A direction and when the detent plate 21 is rotated in the B direction opposite to the A direction, and to obtain a center value of the obtained current backlash width Wp as the center Cr of a corrected new backlash Ba. Accordingly, a new center Cr of the backlash Ba can be obtained based on the output value of the output shaft rotation angle sensor 13 and the output value of the rotor rotation angle sensor 12 without estimating the current backlash width Wp using a linear approximation or the like, so that the new center Cr of the backlash Ba can be easily obtained.

Further, in the present embodiment, as described above, the driving force transmission mechanism 14 is provided with the speed reducing mechanism 14*a* that rotates the detent plate 21 in a state in which the rotation speed transmitted from the motor 11 side is reduced and includes the backlash width W. The ECU 15 is configured to correct the deviation Ga from the center Cp of the preset backlash Ba when the current backlash width Wp included in the speed reducing mechanism 14*a* detected based on the output value of the output shaft rotation angle sensor 13 and the output value of the rotor rotation angle sensor 12 is equal to or greater than the predetermined value during the shift switching operation. Accordingly, by correcting at least the deviation Ga from the center Cp of the preset backlash Ba caused by the current backlash width Wp included in the speed reducing mechanism 14*a*, the center Cr of the backlash Ba can be accurately matched with the positions of the valley bottoms V of the valley portion 21*a*, the valley portion 21*b*, the valley portion 21*c*, and the valley portion 21*d* of the detent plate 21, so that the position control of the detent spring 22 can be accurately performed during the shift switching operation.

[Modification]

It should be considered that the above-mentioned embodiments disclosed here are examples in all respects and are not restrictive. The scope of this disclosure is shown by the claims rather than the description of the above-mentioned embodiments and further includes all changes (modifications) within the scope and meaning equivalent to the claims.

For example, in the above-mentioned embodiments, an example in which the control for correcting the center value of the backlash width W is performed for each shift position switching operation has been shown, but this disclosure is not limited to this. In this disclosure, control for correcting the center value of the backlash width may be performed periodically not for each shift position switching operation but for each predetermined number of times of switching.

Further, in the above-mentioned embodiments, an example in which the backlash width W is the backlash width W of the speed reducing mechanism 14*a* has been shown, but this disclosure is not limited to this. In this disclosure, the backlash width may include a backlash width other than the speed reducing mechanism in the driving force transmission mechanism.

Further, in the above-mentioned embodiments, an example in which there are four shift positions (P, R, N and D) has been shown, but this disclosure is not limited to this. In this disclosure, for example, the disclosure may be applied to a shift device having the number of shift positions other than four.

Further, in the above-mentioned embodiments, an example in which the shift device 100 disclosed here is applied to the shift device 100 for a vehicle has been shown, but this disclosure is not limited to this. In this disclosure, the shift device may be applied to a shift device other than that for a vehicle, for example, a train.

Further, in the above-mentioned embodiments, an example in which the ECU 15 is configured to correct the deviation Ga from the center Cp of the preset backlash Ba when the current backlash width Wp is equal to or greater than the predetermined value has been shown, but this disclosure is not limited to this. In this disclosure, the ECU may be configured to correct the deviation from the center of a preset backlash when the increase amount in the current backlash width is equal to or greater than a specified value.

Further, in the above-mentioned embodiments, for the convenience of explanation, an example in which a control process of the ECU 15 is described by using a flow-driven flowchart for sequentially carrying out a process according to a processing flow has been shown, but this disclosure is not limited to this. In this disclosure, the control process of the ECU may be carried out by an event-driven type process for executing a process in event units. In this case, the process may be carried out in a completely event-driven manner, or may be carried out by combining event-driven and flow-driven.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

A shift device according to one aspect of this disclosure is directed to a shift device mounted on a vehicle. The shift device includes a shift switching member including a plurality of valley portions provided so as to correspond to shift positions, a positioning member configured to cause the shift position to be established while being fitted in any of the plurality of valley portions of the shift switching member, a motor configured to drive the shift switching member and including a rotor and a stator, a driving force transmission mechanism configured to transmit a driving force from the motor to the shift switching member, a rotor rotation angle sensor configured to detect a rotation angle of the rotor, and an output shaft rotation angle sensor configured to detect a rotation angle of the shift switching member, in which the shift device is configured to correct a deviation from a center of a preset backlash when a backlash width included in the driving force transmission mechanism detected based on an output value of the output shaft rotation angle sensor and an output value of the rotor rotation angle sensor is equal to or greater than a predetermined value during a shift switching operation.

As described above, the shift device according to one aspect of this disclosure is provided with the shift switching member including the plurality of valley portions provided so as to correspond to the shift positions and a positioning member for establishing the shift position while being fitted in any of the plurality of valley portions of the shift switching member. The shift device is configured to correct the deviation from the center of the preset backlash when the backlash width included in the driving force transmission mechanism detected based on the output value of the output shaft rotation angle sensor and the output value of the rotor rotation angle sensor is equal to or greater than the predetermined value during the shift switching operation. Accordingly, by correcting the deviation from the center of the preset backlash, positions of the center of the backlash corresponding to the positions of the valley bottoms of the plurality of valley portions of the shift switching member can be corrected without pressing the positioning member against the wall of the shift switching member, so that rotation angles of the motor corresponding to the positions of the center of the corrected backlash can be obtained. As a result, it is possible to correct the rotation angle of the motor that causes the positioning member to reach the valley bottoms of the valley portions of the shift switching member without applying an excessive load to the positioning member. In addition, during the shift switching operation, by correcting the deviation from the center of the preset backlash, the center of the preset backlash can be corrected in accordance with the center of a backlash caused by the backlash width included in the driving force transmission mechanism that increases due to aged wear, so that a state in which the center of the backlash matches with the positions of the valley bottoms of the plurality of valley portions of the shift switching member can be maintained. As a result, it is possible to prevent a decrease in an accuracy of position control of the positioning member during the shift switching operation.

It is preferable that the shift device according to the above-mentioned one aspect is configured to correct the deviation from the center of the preset backlash based on a deviation between positions of the valley bottoms of the plurality of valley portions of the shift switching member and the center of the preset backlash during the shift switching operation.

With such a configuration, by correcting a deviation from the center of the preset backlash, the center of the backlash can be accurately matched with the positions of the valley bottoms of the plurality of valley portions of the shift switching member, so that the position control of the positioning member during the shift switching operation can be accurately performed and a decrease in a determination accuracy of the shift position can be prevented.

It is preferable that the shift device according to the above-mentioned one aspect is configured to correct the deviation from the center of the preset backlash based on an increase amount in the backlash width with respect to an initial backlash width.

With such a configuration, the deviation of the center of the backlash caused by an increase in the backlash width due to wear of the backlash of the driving force transmission mechanism can be corrected, so that the state in which the center of the backlash matches with the positions of the valley bottoms of the plurality of valley portions of the shift switching member can be maintained. As a result, it is possible to prevent a decrease in the accuracy of the position control of the positioning member during the shift switching operation.

In this case, it is preferable that the shift device is configured to offset the center of the preset backlash by the increase amount in the backlash width as the deviation from the center of the preset backlash based on the increase amount in the backlash width with respect to the initial backlash width.

With such a configuration, by offsetting the center of the preset backlash in accordance with the increase amount in the backlash width due to the wear of the backlash of the driving force transmission mechanism, the deviation between the center of the preset backlash and the positions of the valley bottoms of the plurality of valley portions of the shift switching member can be compensated. As a result, the state in which the center of the backlash matches with the positions of the valley bottoms of the plurality of valley portions of the shift switching member can be maintained, so that a decrease in the accuracy of the position control of the positioning member during the shift switching operation can be prevented.

It is preferable that the shift device according to the above-mentioned one aspect is configured to obtain the backlash width based on the output value of the output shaft rotation angle sensor and the output value of the rotor rotation angle sensor in moving sections in which the positioning member moves from the valley bottoms of the valley portions of the shift switching member to top portions of mountain portions when the shift switching member is rotated in a first direction and when the shift switching member is rotated in a second direction opposite to the first direction, and to obtain a center value of the obtained backlash width as a center of a corrected new backlash.

With such a configuration, a new center of backlash can be obtained based on the output value of the output shaft rotation angle sensor and the output value of the rotor rotation angle sensor without estimating the backlash width using linear approximation or the like, so that a new center of backlash can be easily obtained.

It is preferable that, in the shift device according to the above-mentioned one aspect, the driving force transmission mechanism includes a speed reducing mechanism having the backlash width and is configured to rotate the shift switching member in a state in which a rotation speed transmitted from the motor side is reduced, and the shift device is configured to correct the deviation from the center of the preset backlash when the backlash width included in the speed reducing mechanism detected based on the output value of the output shaft rotation angle sensor and the output value of the rotor rotation angle sensor is equal to or greater than the predetermined value during the shift switching operation.

With such a configuration, by correcting at least the deviation from the center of the preset backlash caused by the backlash width included in the speed reducing mechanism, the center of the backlash can be accurately matched with the positions of the valley bottoms of the plurality of valley portions of the shift switching member, so that the position control of the positioning member can be accurately performed during the shift switching operation.

In addition, the following configurations are also possible in the shift device according to the above-mentioned one aspect.

(Appendix 1)

That is, the shift device including the shift switching member that rotates in the first direction and the second direction is configured to obtain the backlash width based on a difference between a first rotation angle of the rotor measured by the rotor rotation angle sensor corresponding to a valley bottom of a valley portion at predetermined shift position when the shift switching member is rotated in the first direction and a second rotation angle of the rotor measured by the rotor rotation angle sensor corresponding to a valley bottom of a valley portion at a predetermined shift position when the shift switching member is rotated in the second direction, and to obtain a center value of the obtained backlash width as a center of a corrected new backlash.

With such a configuration, the backlash width can be obtained more accurately by obtaining the backlash width using both the first rotation angle and the second rotation angle, so that a new center of backlash can be obtained more accurately.

(Appendix 2)

In this case, the shift device is configured to, when a difference between an initial rotation angle of the rotor measured by the rotor rotation angle sensor corresponding to a valley bottom of a valley portion at a predetermined shift position when the shift switching member is rotated in the first direction and the first rotation angle is greater than or equal to a threshold value, obtain a backlash width based on the difference between the first rotation angle and the second rotation angle, and obtain a center value of the obtained backlash width as a center of a corrected new backlash.

With such a configuration, by obtaining the backlash width when the difference between the initial rotation angle and the first rotation angle is equal to or greater than the threshold value, a process of obtaining the backlash width can be efficiently performed, and a control load of the process of obtaining the backlash width can be reduced, compared with a case where the backlash width is always obtained.

(Appendix 3)

The shift device according to the above-mentioned one aspect is configured to obtain the backlash width based on the output value of the output shaft rotation angle sensor and the output value of the rotor rotation angle sensor each time the shift switching operation is performed, and to correct the deviation from the center of the preset backlash when the backlash width is equal to or greater than the predetermined value.

With such a configuration, an increase in the backlash width of the driving force transmission mechanism due to wear can be detected at an early stage, so that the deviation between the center of the backlash and the positions of the valley bottoms of the plurality of valley portions of the shift switching member can be corrected at an early stage.

What is claimed is:
1. A shift device mounted on a vehicle, the shift device comprising:
  a detent plate including a plurality of valley portions provided so as to correspond to shift positions;
  a detent spring configured to cause the shift position to be established while being fitted in any of the plurality of valley portions of the detent plate;
  a motor configured to drive the detent plate and including a rotor and a stator;
  a driving force transmission mechanism configured to transmit a driving force from the motor to the detent plate;
  a rotor rotation angle sensor configured to detect a rotation angle of the rotor;
  an output shaft rotation angle sensor configured to detect a rotation angle of the detent plate; and a controller including a processor, the controller is configured to correct a deviation from a center of a preset backlash when an increase amount in a backlash width included in the driving force transmission mechanism detected based on an output value of the output shaft rotation angle sensor and an output value of the rotor rotation angle sensor is equal to or greater than a predetermined value during a shift switching operation.

2. The shift device according to claim 1, wherein the controller is configured to correct the deviation from the center of the preset backlash based on a deviation between positions of the valley bottoms of the plurality of valley portions of the detent plate and the center of the preset backlash during the shift switching operation.

3. The shift device according to claim 1, wherein the controller is configured to correct the deviation from the center of the preset backlash based on an increase amount in the backlash width with respect to an initial backlash width.

4. The shift device according to claim 3, wherein the controller is configured to offset the center of the preset backlash by the increase amount in the backlash width as the deviation from the center of the preset backlash based on the increase amount in the backlash width with respect to the initial backlash width.

5. The shift device according to claim 1, wherein the controller is configured to obtain the backlash width based on the output value of the output shaft rotation angle sensor and the output value of the rotor rotation angle sensor in moving sections in which the detent spring moves from the valley bottoms of the valley portions of the detent plate to top portions of mountain portions when the detent plate is rotated in a first direction and when the detent plate is rotated in a second direction opposite to the first direction, and to obtain a center value of the obtained backlash width as a center of a corrected new backlash.

6. The shift device according to claim 1, wherein the driving force transmission mechanism includes a speed reducing mechanism having the backlash width and is configured to rotate the detent plate in a state in which a rotation speed transmitted from the motor side is reduced, and the controller is configured to correct the deviation from the center of the preset backlash when the backlash width included in the speed reducing mechanism detected based on the output value of the output shaft rotation angle sensor and the output value of the rotor rotation angle sensor is equal to or greater than the predetermined value during the shift switching operation.

7. A shift device mounted on a vehicle, the shift device comprising:
a detent plate including a plurality of valley portions provided so as to correspond to shift positions;
a detent spring configured to cause the shift position to be established while being fitted in any of the plurality of valley portions of the detent plate;
a motor configured to drive the detent plate and including a rotor and a stator;
a driving force transmission mechanism configured to transmit a driving force from the motor to the detent plate;
a rotor rotation angle sensor configured to detect a rotation angle of the rotor;
an output shaft rotation angle sensor configured to detect a rotation angle of the detent plate; and
a controller including a processor, the controller is configured to
determine whether the shift position is switched to a predetermined shift position,
when it is determined that the shift position is switched to the predetermined shift position
obtain a first angle of rotation of the rotor,
obtain a difference between the obtained first angle of rotation of the rotor and an initial rotation angle corresponding to the predetermined shift position,
determined if the obtained difference is greater than or equal to a predetermined threshold value, and
store the first angle of rotation,
determine whether the shift position is switched to another predetermined shift position,
when it is determined that the shift position is switched to the another predetermined shift position
obtain a second angle of rotation of the rotor,
obtain a current backlash width based on a difference between the first angle of rotation and the second angle of rotation,
obtain an increase amount of the current backlash width based on a difference between an initial backlash width and the current backlash width, and
offset a center of a backlash by the increase amount of the current backlash width.

* * * * *